(12) United States Patent
Pandian et al.

(10) Patent No.: US 10,816,074 B2
(45) Date of Patent: Oct. 27, 2020

(54) ACTUATOR MECHANISM

(71) Applicant: Goodrich Actuation Systems Limited, Solihull, West Midlands (GB)

(72) Inventors: Navaneethakrishnan Pandian, Karnataka (IN); Narendran Muralidharan, Tamilnadu (IN); David John Langford, Wolverhampton (GB)

(73) Assignees: GOODRICH ACTUATION SYSTEMS LIMITED, West Midlands (GB); GOODRICH AEROSPACE SERVICES PRIVATE LIMITED, Bangalore, Karnataka (IN)

( * ) Notice: Subject to any disclaimer, the term of this patent is extended or adjusted under 35 U.S.C. 154(b) by 0 days.

(21) Appl. No.: 15/048,241

(22) Filed: Feb. 19, 2016

(65) Prior Publication Data
US 2016/0245387 A1 Aug. 25, 2016

(30) Foreign Application Priority Data
Feb. 19, 2015 (EP) ..................................... 15155762

(51) Int. Cl.
*F16H 53/02* (2006.01)
*F15B 15/26* (2006.01)
(Continued)

(52) U.S. Cl.
CPC ............. *F16H 53/02* (2013.01); *B64D 29/06* (2013.01); *E05F 15/53* (2015.01); *E05F 15/611* (2015.01);
(Continued)

(58) Field of Classification Search
CPC .......... F16H 53/02; F16H 53/06; E05F 15/53; E05F 15/611; B64D 29/06; F15B 15/261;
(Continued)

(56) References Cited

U.S. PATENT DOCUMENTS 2,923,206 A * 2/1960 Kovac ....................... B23C 3/32
409/76
3,799,036 A * 3/1974 Slaughter .............. F15B 15/261
188/110

(Continued)

FOREIGN PATENT DOCUMENTS

EP 2532821 A2 12/2012
FR 2666111 A1 2/1992

OTHER PUBLICATIONS

European Search Report for application No. EP15155762.6; dated Aug. 26, 2015, 6 pages.

*Primary Examiner* — Adam D Rogers
(74) *Attorney, Agent, or Firm* — Cantor Colburn LLP

(57) ABSTRACT

An actuator system comprising a rotatable lock mechanism defining a path for an actuator pin as the actuator is expanded and retracted, wherein the lock mechanism defines an entry passage through which the pin enters as the actuator extends, a guide surface along which the pin travels from the entry passage as the actuator retracts, a locking recess into which the pin is guided by the guide surface, and an exit passage into which the pin is guided as it is caused to leave the lock recess by extension of the actuator and subsequent retraction; whereby a detent surface is provided to prevent the pin returning back into the lock recess when the actuator is extended to cause the pin to leave the lock recess; and whereby the lock mechanism provides a sloping engagement surface for the pin, either side of the entry passage.

3 Claims, 30 Drawing Sheets

(51) Int. Cl.
*B64D 29/06* (2006.01)
*E05F 15/611* (2015.01)
*E05F 15/53* (2015.01)

(52) U.S. Cl.
CPC ......... *F15B 15/261* (2013.01); *E05Y 2201/42* (2013.01); *E05Y 2201/638* (2013.01); *E05Y 2900/502* (2013.01)

(58) Field of Classification Search
CPC ........... E05Y 2201/42; E05Y 2201/638; E05Y 2800/744; E05Y 2900/502; Y10T 403/7009
See application file for complete search history.

(56) References Cited

U.S. PATENT DOCUMENTS

| | | | | |
|---|---|---|---|---|
| 5,222,277 | A * | 6/1993 | Harvey | B64G 1/22 16/48.5 |
| 7,540,207 | B2 * | 6/2009 | Hoffman | B64C 1/1407 74/25 |
| 7,975,584 | B2 * | 7/2011 | McCabe | A61F 13/15723 53/462 |
| 8,272,285 | B2 * | 9/2012 | Kearns | B64C 25/24 74/89.37 |
| 9,140,048 | B2 * | 9/2015 | Langford | E05F 15/53 |
| 9,631,412 | B2 * | 4/2017 | Hellwig | E05F 3/104 |
| 10,393,153 | B2 * | 8/2019 | Pandian | B64D 29/06 |
| 2009/0139141 | A1 * | 6/2009 | MacLeod | E05F 1/1091 49/21 |
| 2011/0197391 | A1 * | 8/2011 | Yu | E05F 3/104 16/51 |
| 2017/0321731 | A1 * | 11/2017 | Pandian | F15B 15/261 |

* cited by examiner

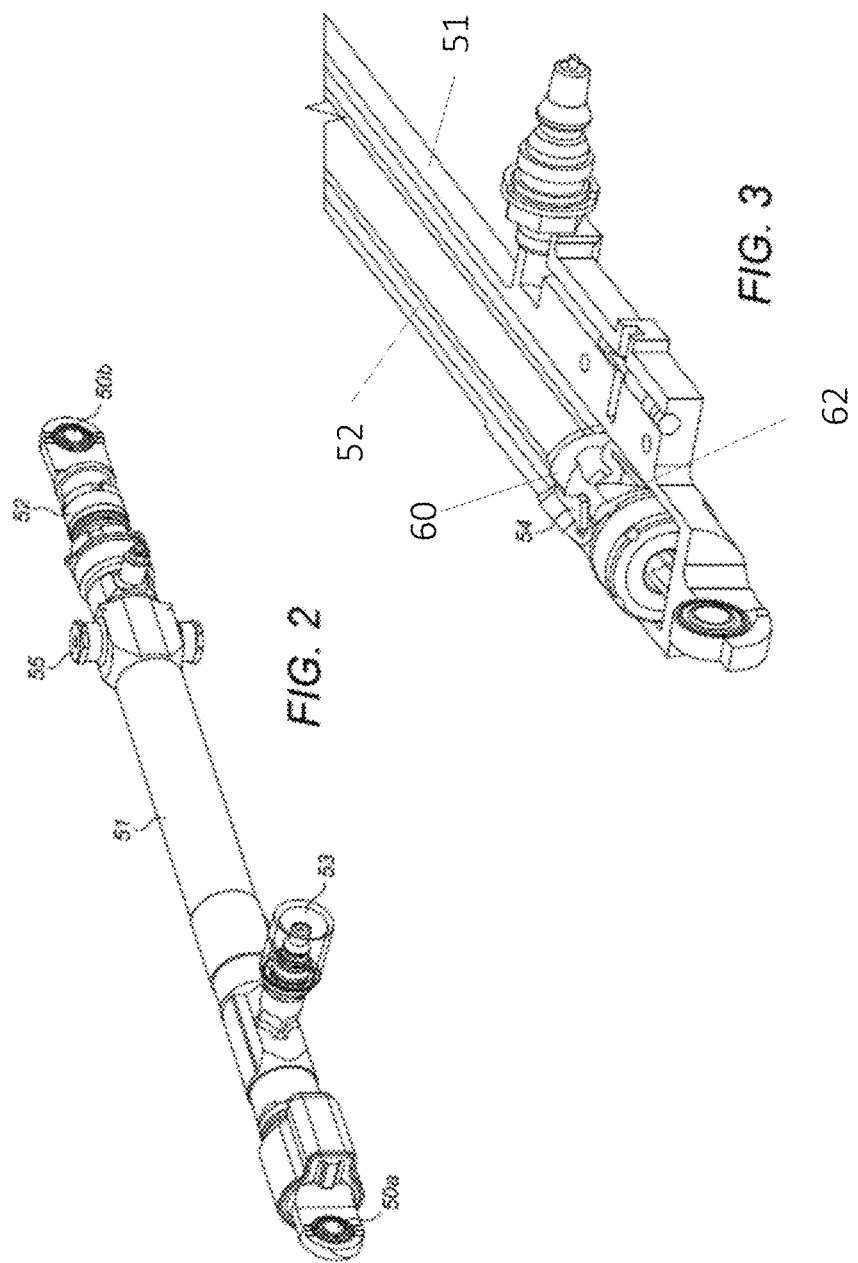

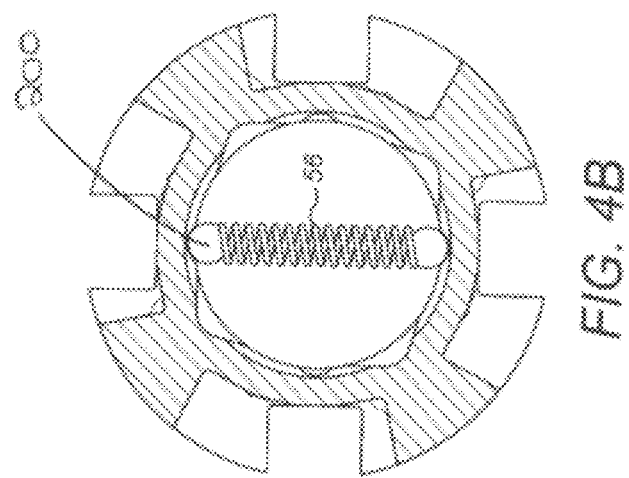
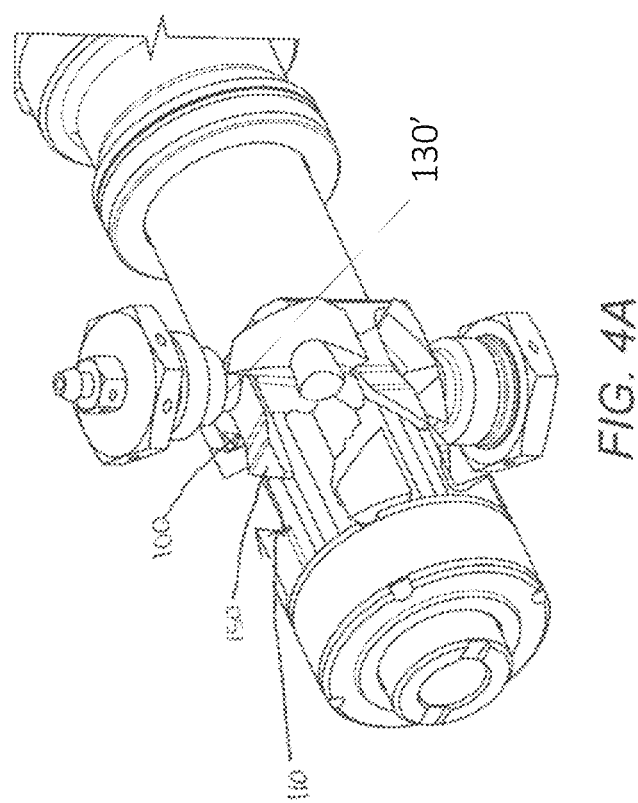

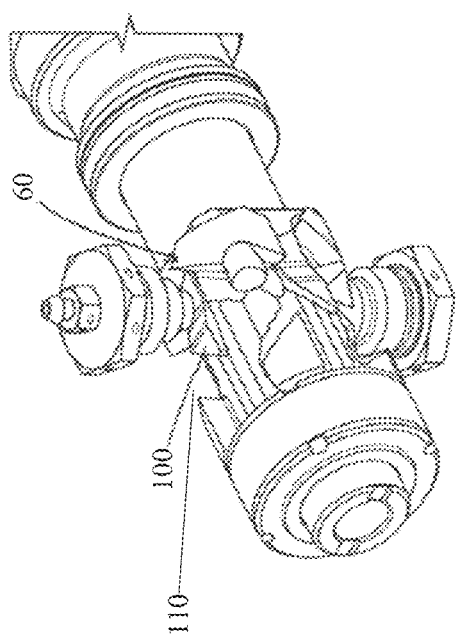
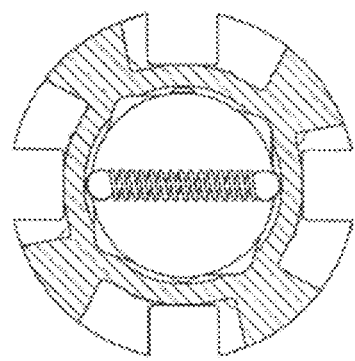
FIG. 5A
FIG. 5B

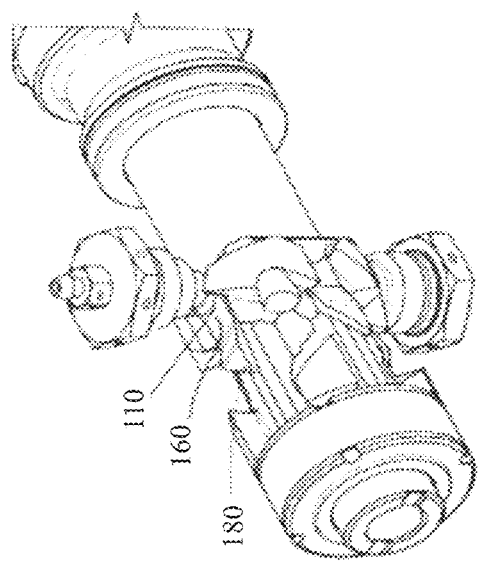
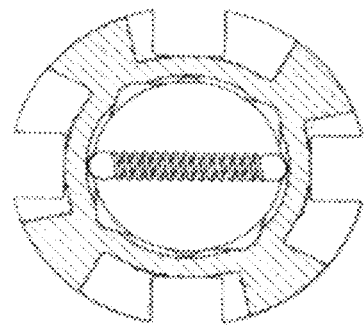

ACTUATOR MECHANISM

FOREIGN PRIORITY

This application claims priority to European Patent Application No. 15155762.6 filed Feb. 19, 2015, the entire contents of which is incorporated herein by reference.

TECHNICAL FIELD

The present invention relates to an actuator mechanism moveable between a locked and an unlocked position. The mechanism is particularly, but not exclusively, for use in aircraft engines, and finds particular application in opening and closing aircraft engine cowls.

BACKGROUND OF THE INVENTION

Aircraft engine cowls such as those covering the C-duct and fans need to be opened occasionally to allow access to the engine for e.g. repair and maintenance, and then closed again. Actuators are provided to open and close the cowls. Preferably no pressure or driving force should be required to keep the actuator in the open position, despite the weight of the cowl door.

Conventionally, hydraulic or pneumatic actuators are used, although other types of actuator, e.g. electrical or mechanical, may also be used. The actuators generally comprise an extendible rod or arm that is attached to open the cowl as it extends and close the cowl as it retracts under the weight of the cowl door.

A typical hydraulic actuator comprises a piston rod, a cylinder and a rotatable lock mechanism to facilitate mechanical operation of the cowl door or flap. Pressure is applied to fully extend the actuator; when fully extended, pressure is removed allowing the actuator to retract by a small amount which causes the actuator to lock, as the lock mechanism rotates and engages the activator. To close, or stow, the cowl door, the actuator is then extended by application of pressure out of the locked position to its fully extended position from which, as pressure is removed, the actuator is able to return to a retracted, stowed, position.

A rotatable lock mechanism, in cooperation with a lock pin, provides the paths for the actuator to take up its locked position or return to its stowed position, as will be described further below.

Whilst such an arrangement permits locking of the actuator in an extended position, and so does not require the associated hydraulic pump to be operating throughout the period of time that the associated door or doors are to be held in their open positions, there is a risk that if the actuator has not fully extended before being retracted by a small amount to take up the locked state, the actuator may come to rest in an intermediate position and appear to be locked in its extended position without the locking mechanism being properly engaged. In such circumstances, after the hydraulic pressure has been removed, jarring or vibrations could result in disengagement of the lock arrangement and the actuator being unable to hold the door(s) in the open position. Clearly, this is undesirable.

EP 2532821 describes an improved actuator mechanism that avoids the actuator stopping in such an intermediate position. EP 2532821 provides a resilient detent in the paths for a locking pin provided by the lock mechanism such that once the locking pin has moved beyond a predetermined position in the extending direction the resilient detent prevents return movement of the pin along the entry path.

A further problem has been identified with the known actuator mechanism when the actuator is used to return the cowl to the stowed state. Here, as mentioned above, the actuator is extended (out of the locked state) and then, due to the paths defined by the lock mechanism, returns to the retracted state, via an exit path. If, however, the actuator is not fully or sufficiently extended to clear the path for the locked state, the pin can again become stuck in position at an intermediate point, rather than automatically feed into and follow the exit path under the weight of the cowl. This intermediate position can be falsely interpreted as a locked state. If the actuator is jolted or slightly disturbed, the locking pin can slip from the intermediate point, back into the locked position, which can damage the door as well as damage other parts or cause injury.

Systems such as described in EP '821 include a feature that prevents this problem to some extent. A spring biased detent ball retainer (described further below) ensures that before the actuator locks onto such an intermediate point, the detent ball which is timed to run over a cam-like profile, rotates the collar lock so that the lock pin either moves into the locked state or the unlocked state.

Reliance of the lock mechanism on the torque generated by the spring biased detent ball, however, limits the degrees of angular deviation at which the actuator can operate. Torque generated by the spring biased detent ball shall always be greater than the varying resistive torque. The torque generated is highly sensitive to the cam like profile the detent ball traces. The resistive torque depends upon factors such as thickness of the thin fluid film between the piston and lock collar (clearance), viscous drag on surfaces of rotating components, viscosity of working fluid which is, in turn, a function of ambient temperature.

The present invention therefore aims to provide an actuator locking mechanism that can prevent the actuator becoming stuck in an intermediate position when intended to be moved from the locked position to the stowed position, without reliance on a spring biased detent ball.

SUMMARY

The present invention, in one aspect, provides an actuator system comprising a rotatable lock mechanism defining a path for an actuator pin as the actuator is expanded and retracted, wherein the lock mechanism defines an entry passage through which the pin enters as the actuator extends, a guide surface along which the pin travels from the entry passage as the actuator retracts, a locking recess into which the pin is guided by the guide surface, and an exit passage into which the pin is guided as it is caused to leave the lock recess by extension of the actuator and subsequent retraction; whereby a detent surface is provided to prevent the pin returning back into the lock recess when the actuator is extended to cause the pin to leave the lock recess.

In another aspect, the invention provides an actuator system comprising a rotatable lock mechanism defining a path for an actuator pin as the actuator is expanded and retracted, wherein the lock mechanism defines an entry passage through which the pin enters as the actuator extends, a guide surface along which the pin travels from the entry passage as the actuator retracts, a locking recess into which the pin is guided by the guide surface, and an exit passage into which the pin is guided as it is caused to leave the lock recess by extension of the actuator and subsequent retraction; whereby the lock mechanism provides a sloping engagement surface for the pin either side of the entry passage.

In some embodiments, the guide surface and/or the detent surface provide a slope.

A detent surface may also be provided in the entry passage.

The lock mechanism of the second aspect may provide advantages alone or in combination with the detent of the first aspect.

The rotatable lock mechanism may comprise an interlocking collar and gate ring combination whereby the detents are provided on a gate ring that engages with the collar. Alternatively, the lock mechanism may be an integral component.

A spring biased detent ball arrangement may be provided across the inner surface of the lock mechanism.

BRIEF DESCRIPTION OF DRAWINGS

Preferred embodiments of the invention will now be described by way of example only, and with reference to the drawings.

FIG. 2 shows a perspective view of an actuator according to the invention.

FIG. 3 is a cut-away view of one end of the actuator of FIG. 2, with the cylinder removed to aid description.

FIG. 4A shows the locking mechanism at the start of the locking procedure.

FIG. 4B shows the detent ball mechanism in cross section at the point shown in FIG. 4A.

FIGS. 5A to 17B show how the various components move relative to each other during the locking and unlocking procedure.

DETAILED DESCRIPTION OF THE INVENTION

An existing actuator system will now be described with reference to FIGS. 1 to 17.

Figure 1:
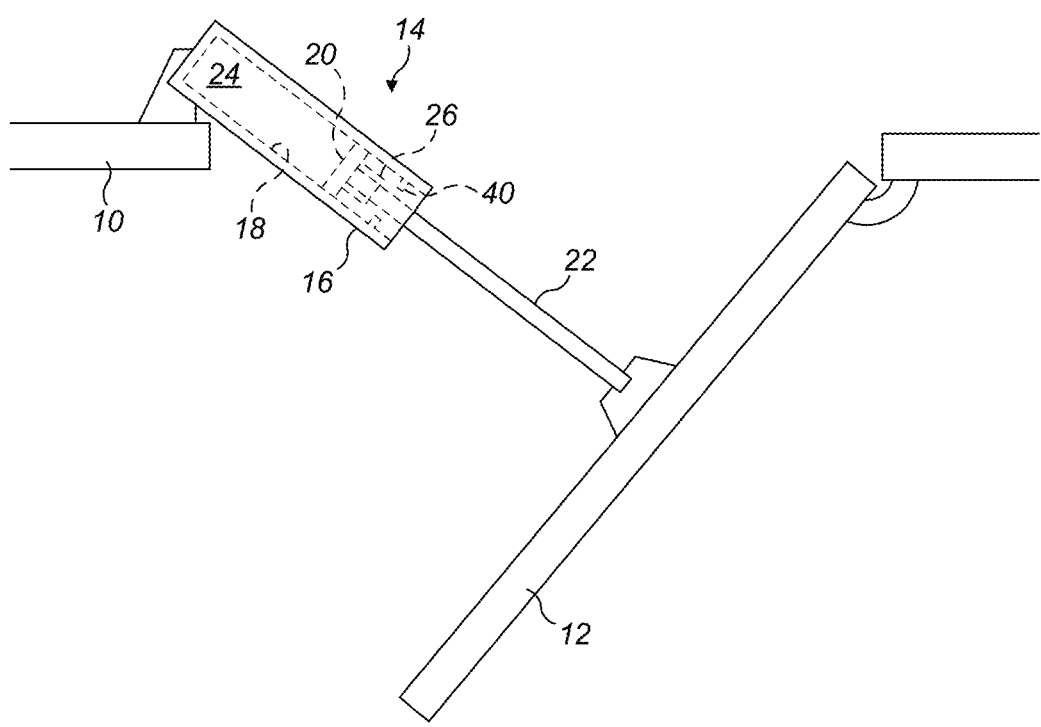
FIG. 1 shows an actuator according to an embodiment of the invention, in use.

FIG. 1 shows an actuator according to an embodiment of the invention, in use. FIG. 1 shows part of an engine housing 10 including a door 12 moveable between a closed, in use position, and an open position. In FIG. 1, the door 12 is shown in its open position. An actuator 14 is arranged to drive the door (12) between the two positions. In the example shown, the actuator is in the form of a hydraulic piston or ram comprising a housing cylinder (16) within which a piston (20) is slidable. The cylinder is mounted to the engine housing 10, by means of an eye end (shown in FIG. 2), while the door is connected to an end of the piston rod (22), again via an eye end. By controlling the pressure of fluid (24) applied to a chamber (18) within the actuator, extension and retraction of the actuator can be controlled so as to drive the door between its closed and opened positions. Other types of actuators may be used, including electrically or mechanically driven actuators.

As shown in more detail in FIGS. 2 and 3, the actuator comprises an eye (50a, 50b) at each end for attachment, respectively, to the engine and to the door to be opened and closed. A cylinder (51) runs between the ends within which an piston rod (52) is axially slidably mounted. A port (53) is provided through the cylinder close to one end, through which fluid can be provided to hydraulically move the piston rod within/along the cylinder. A rotating lock mechanism (54) is provided at an end of the piston (the end closest to the port when the piston is retracted within the cylinder). The lock mechanism is fixed to move axially with the piston rod and is rotatable within the cylinder. One or more locking pins (55) are mounted on and extend through the cylinder wall at a location between the fluid port and the opposite end of the cylinder. As pressure is applied to the piston rod via the fluid port, the rod, together with the lock mechanism, moves axially away from the port, extending the actuator rod and moving the lock mechanism towards the pin(s).

The lock mechanism defines a path for the locking pin(s) including an entry passage, a locking recess, and an exit passage.

The lock mechanism comprises a collar lock 60 comprising a collar having the path defined in its outer surface and, preferably, grooves in e.g. a helical formation on its inner surface. A spring biased detent ball arrangement (56) is biased across the inner bore of the collar such that a spring biases balls to run in and out of the grooves in the inner surface. The lock mechanism also comprises guide surfaces to direct the pins along appropriate paths, and detent means, as described above. These may be provided on one or more gates or rings 62 that cooperate with the collar, or may be formed as part of the collar itself.

Figure 6A:
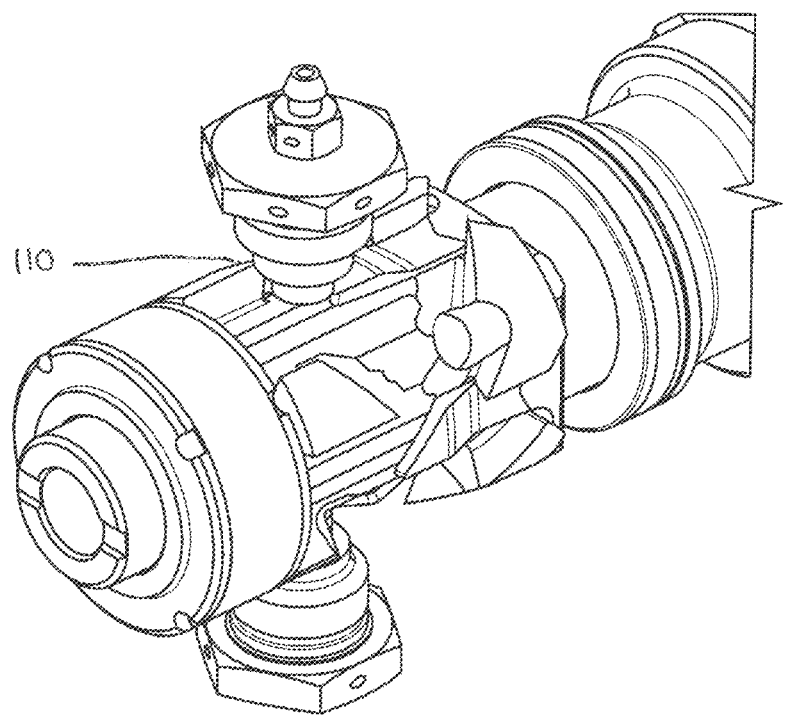
Figure 6B:
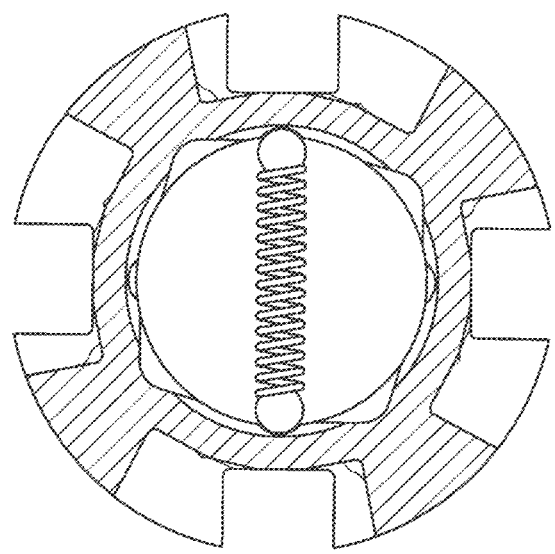
Figure 7A:
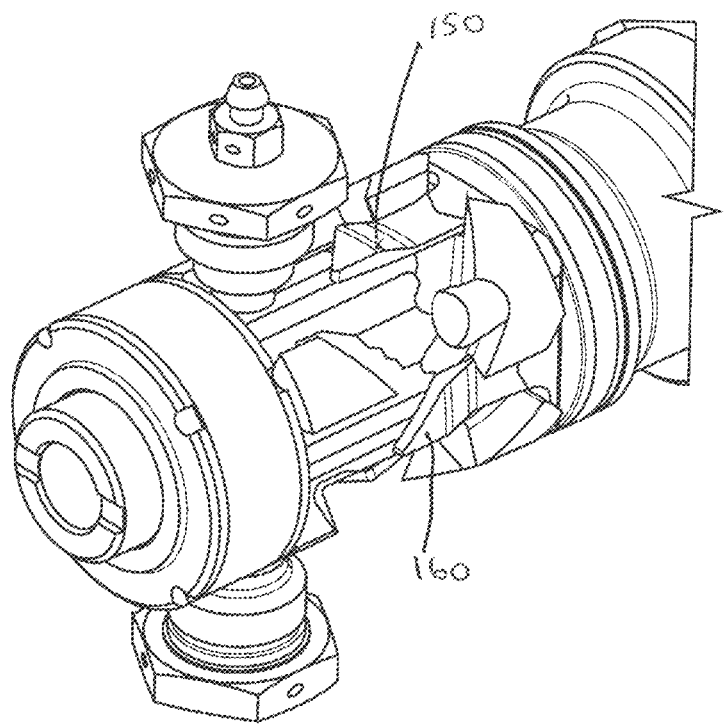
Figure 7B:
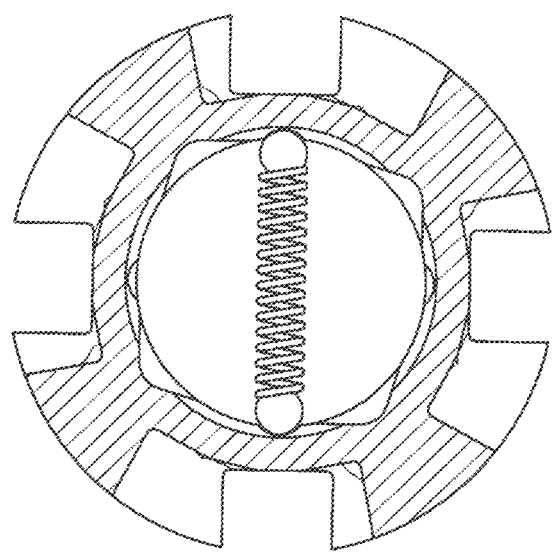
Figure 8A:
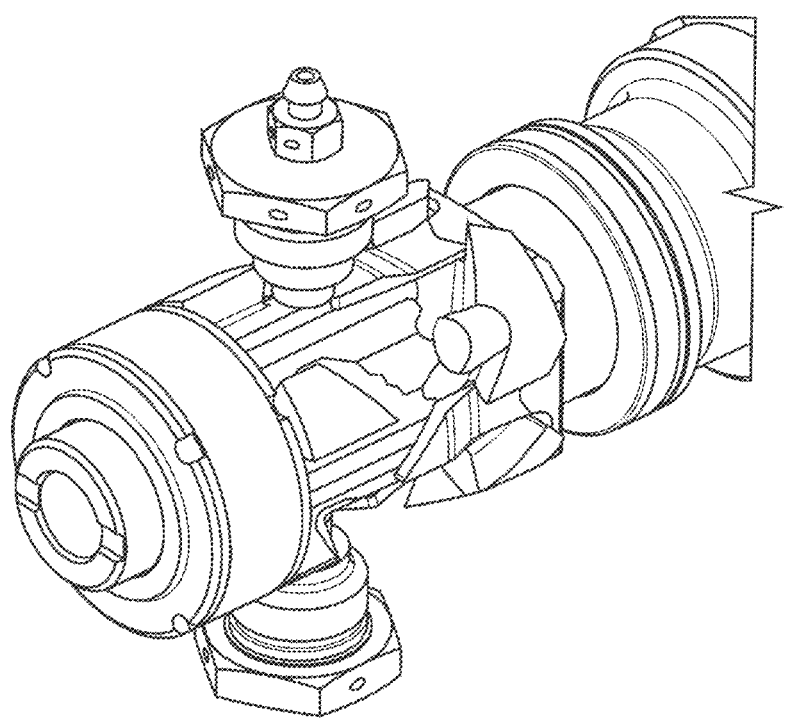
Figure 8B:
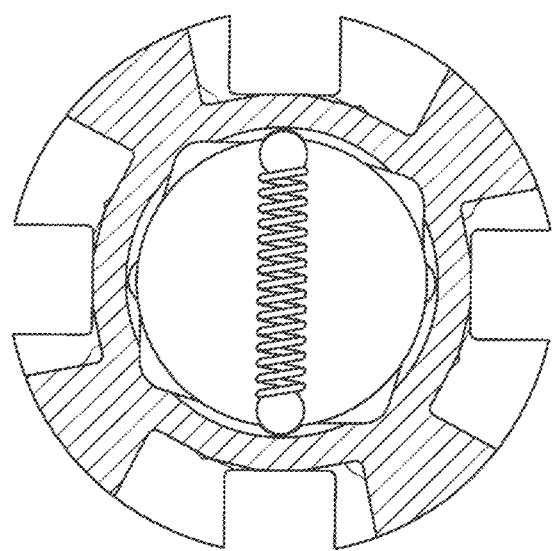
Figure 9A:
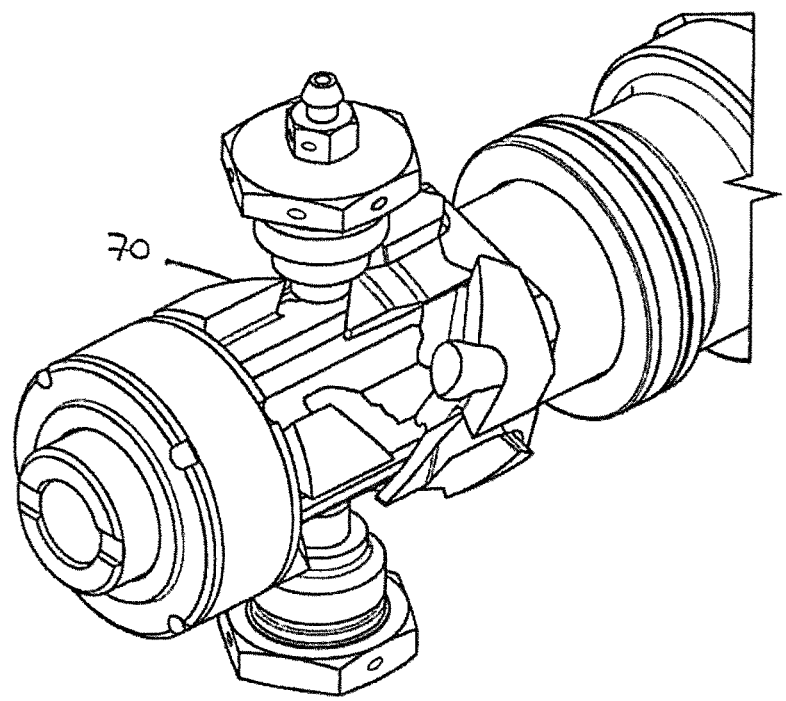
Figure 9B:
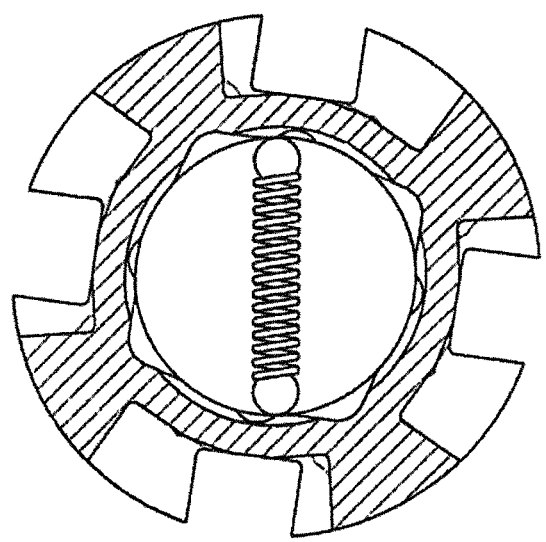
Figure 10A:
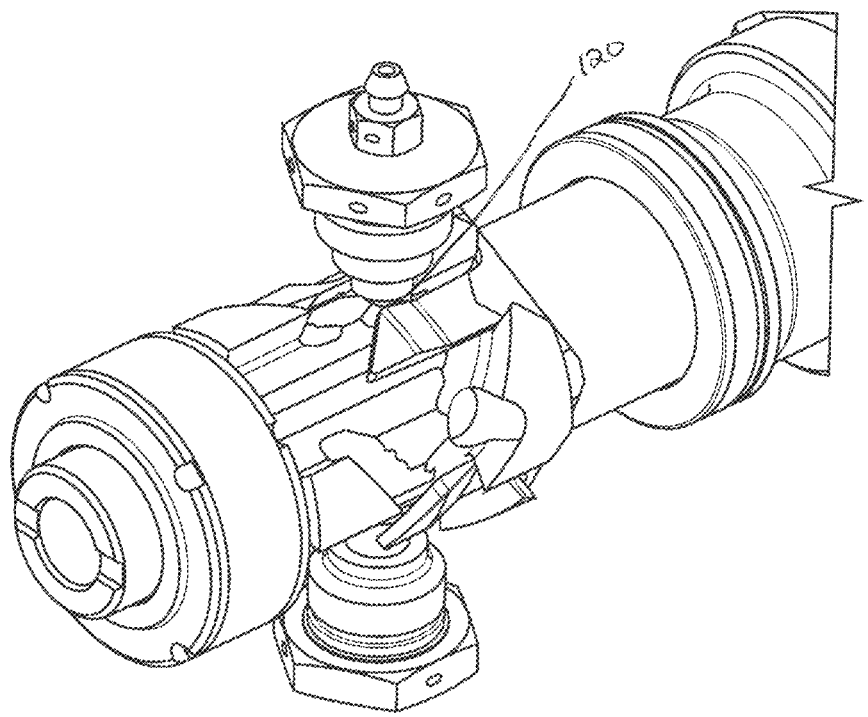
Figure 10B:
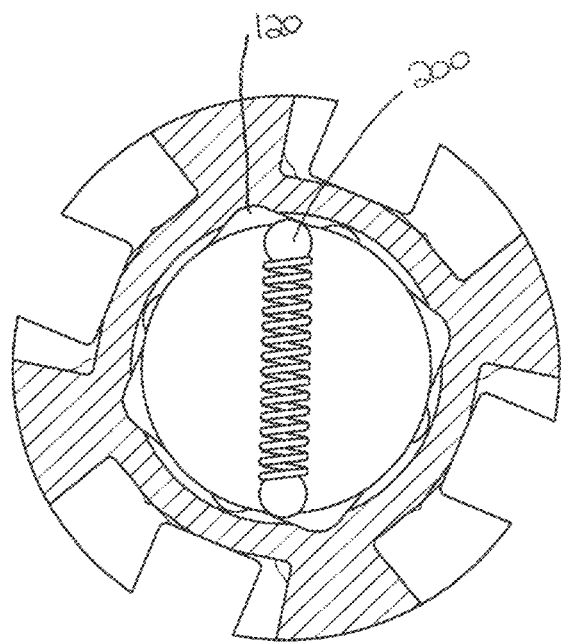
Figure 11A:
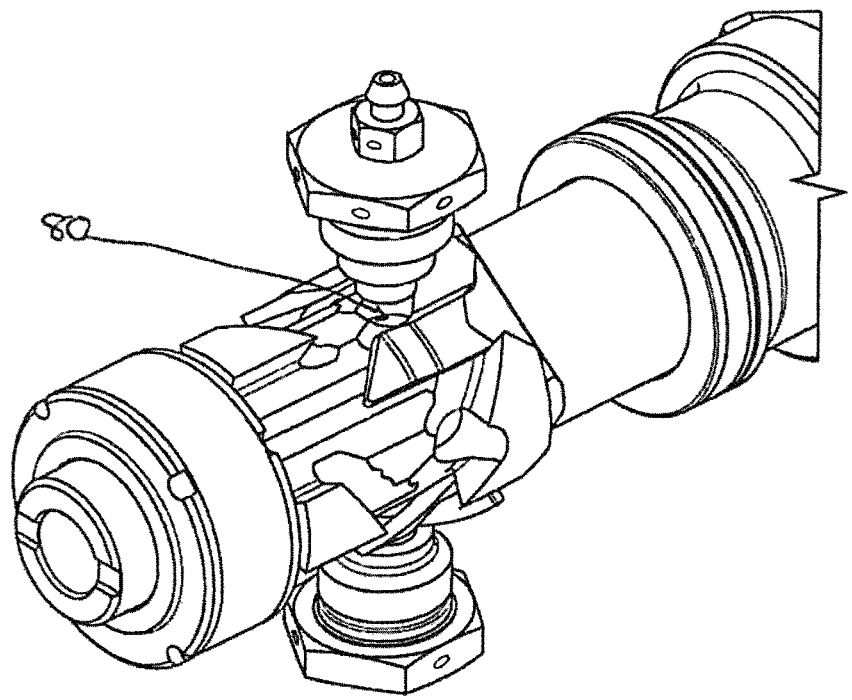
Figure 11B:
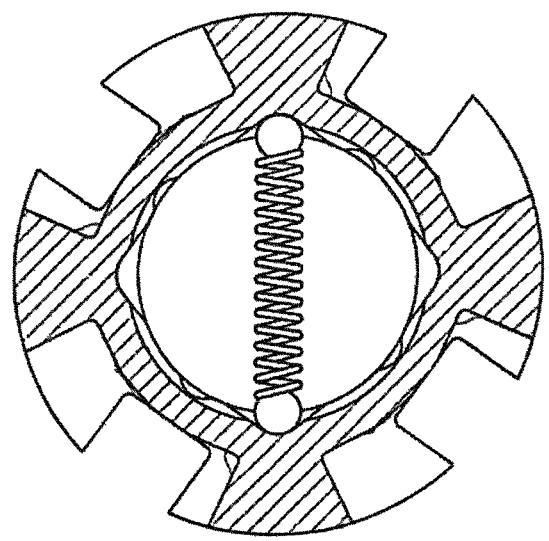
Figure 12A:
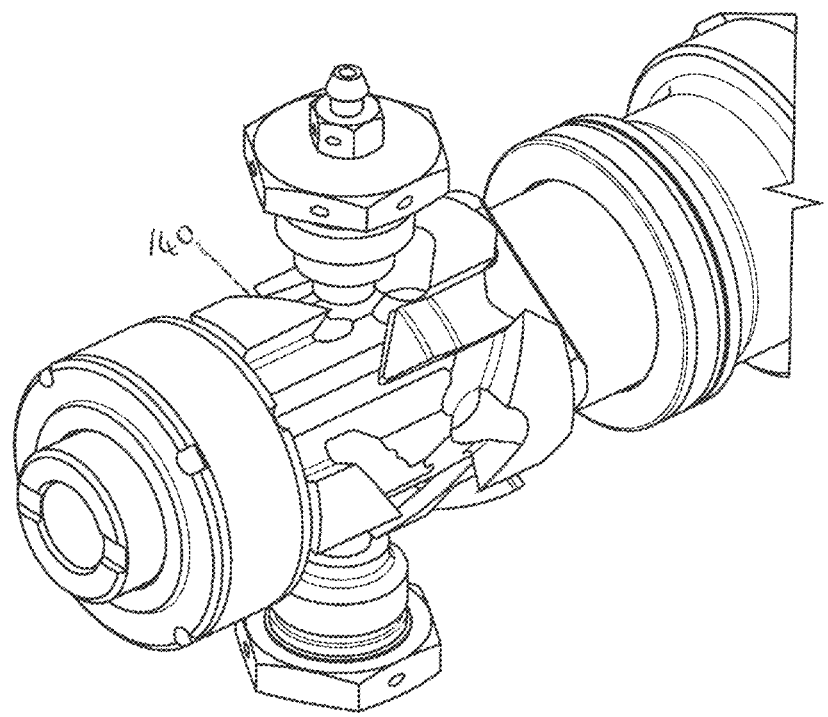
Figure 12B:
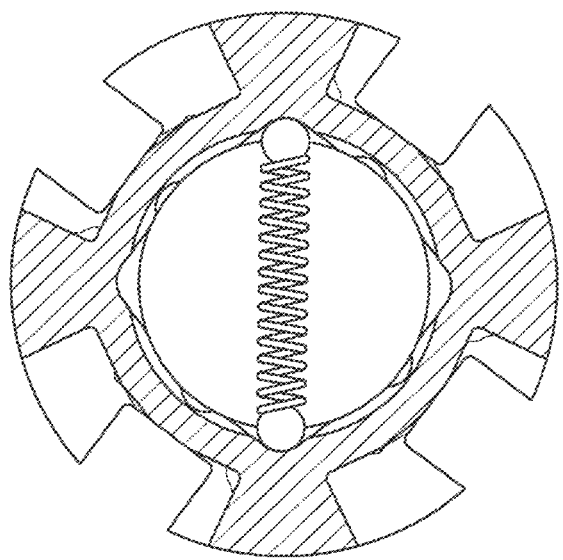

As can be seen in FIGS. 4 to 17, as the actuator extends, the lock mechanism engages the pin(s) in the cylinder, such that a pin enters an entry passage 60 of the collar lock (FIGS. 4A, 4B). As the actuator continues to extend, the pin moves into the entry passage (FIGS. 5A, 5B) riding over a resilient detent finger 100 and pressing it down. After a certain degree of extension, the pin has reached the end of the entry passage and passes over the detent finger 100 which springs back to its raised position so that the pin cannot return along the entry passage (FIGS. 6A, 6B). The actuator is extended further, to its fully extended position. Pressure is then removed from the piston rod (FIGS. 7A, 7B). Removal of the pressure causes the piston rod to retract under the weight of the attached door. The pin then engages and pushes against a sloping guide surface 70 at the end of the entry passageway (FIGS. 8A, 8B) which causes the collar lock to rotate, and the spring based detent ball 200 travels into a groove, thus guiding the pin along a path, and the actuator retracts a small distance with the pin following a new path (FIGS. 9A, 9B). The pin follows this path (FIGS. 10A, 10B) into a lock pocket 80 (FIGS. 11A, 11B) where it remains, holding the actuator, and thus the door, in a locked open position.

Figure 13A:
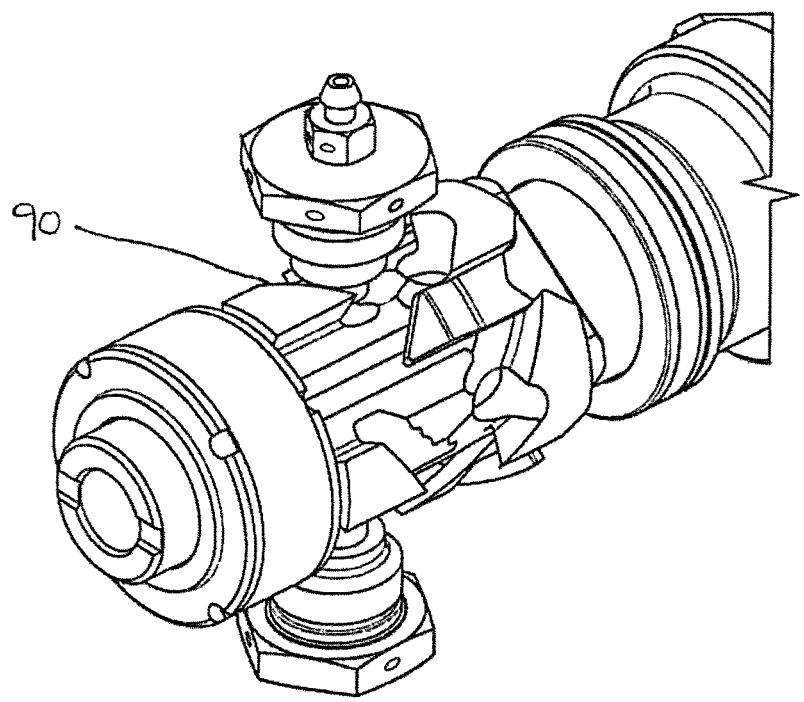
Figure 13B:
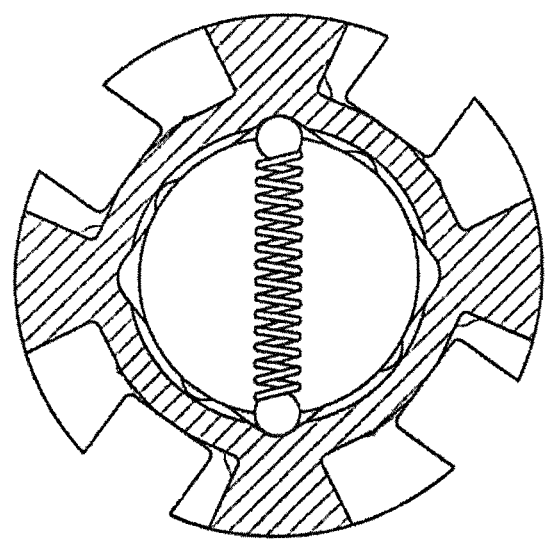

To close the door, pressure is again applied to the piston to extend it sufficient to move back out of the lock recess (FIGS. 12A, 12B) and to abut another sloping guide surface 90 (FIGS. 13A, 13B). The actuator is then fully extended (FIGS. 15A, 15B) after which pressure is then removed causing the actuator to try to retract (FIGS. 16A, 16B) which causes the pin to engage and press against the sloping guide surface which causes further rotation of the collar lock. The pin is guided into an exit passage 110 (FIGS. 17A, 17B) and is able to leave the collar via the exit passage due to the weight of the door causing retraction of the actuator.

Resilient detent means are provided in the passages. As the pin runs over these, it presses them down. Once the pin has passed over the detent means, in some embodiments, the detent means springs pack up preventing return of the pin and also preferably providing a sloped guide surface.

Figure 14A:
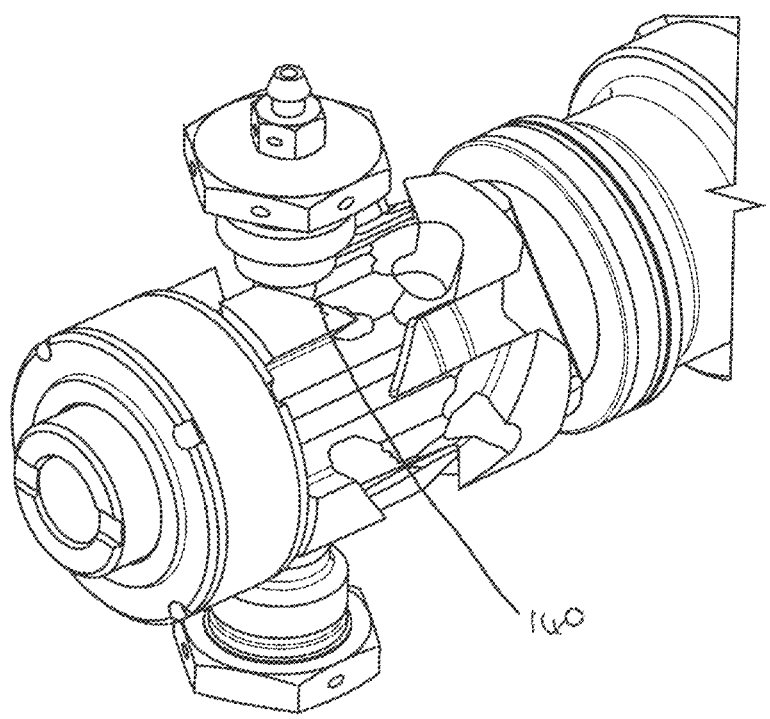
Figure 14B:
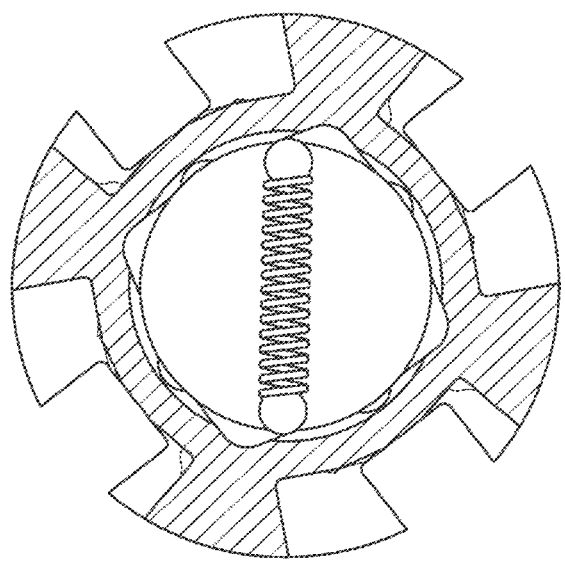
Figure 15A:
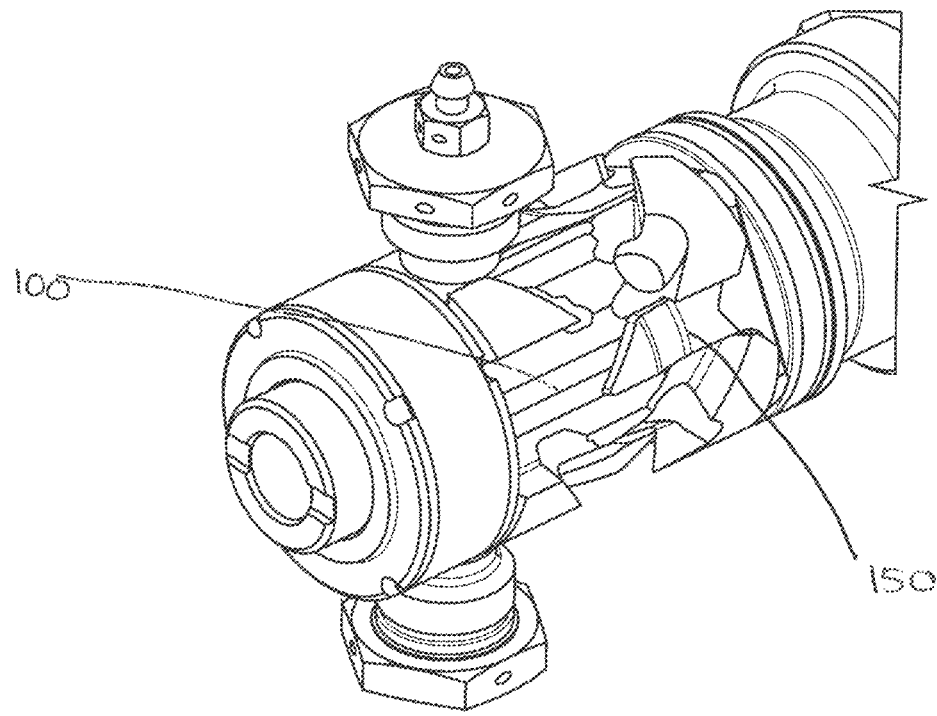
Figure 15B:
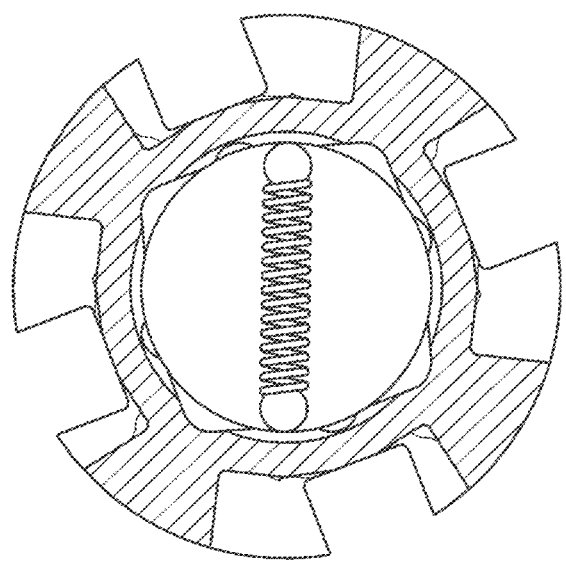
Figure 16A:
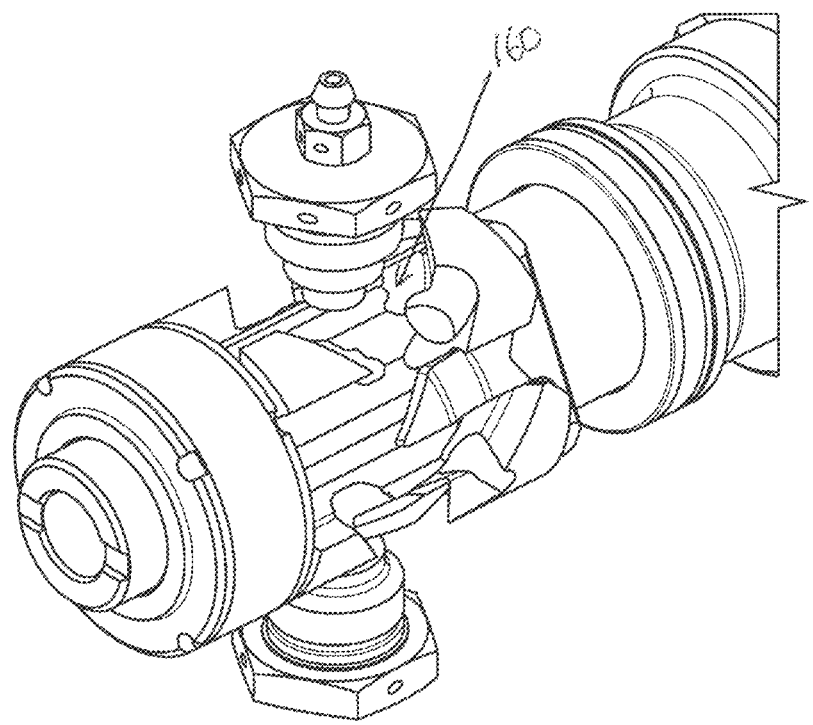
Figure 16B:
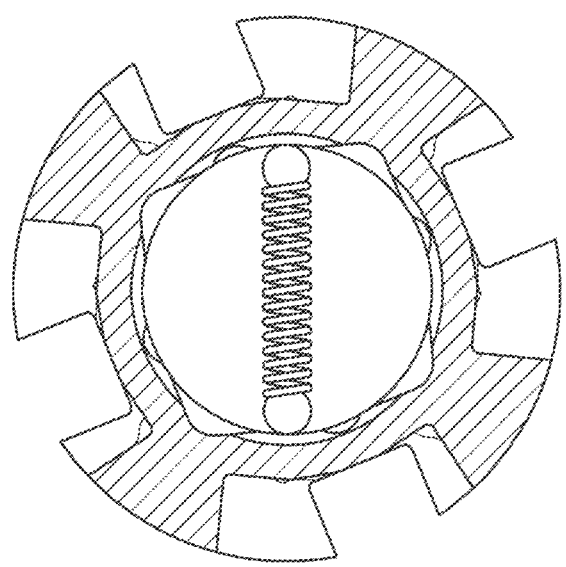

As mentioned above, problems can arise if the actuator is not extended enough for the pin to reach the sloped guide surface to direct it to the next part of the path and into the locking recess. This is shown in FIGS. 14A, 14B. The pins will, however, not pass over the detent means or engage the sloping surfaces to rotate the collar so the actuator will not reach its locked position but it will retract to the stowed position rather than remaining 'almost' locked. The detent means prevent the actuator appearing, falsely, to be locked when the locking procedure has not been completed properly.

The spring biased detent ball 200 also helps to drive the actuator into an end state (locked or stowed) rather than hanging at an intermediate point (FIG. 14B). The reliability and extent of support from the detent ball is, however, very limited, as mentioned above.

Figure 18A:
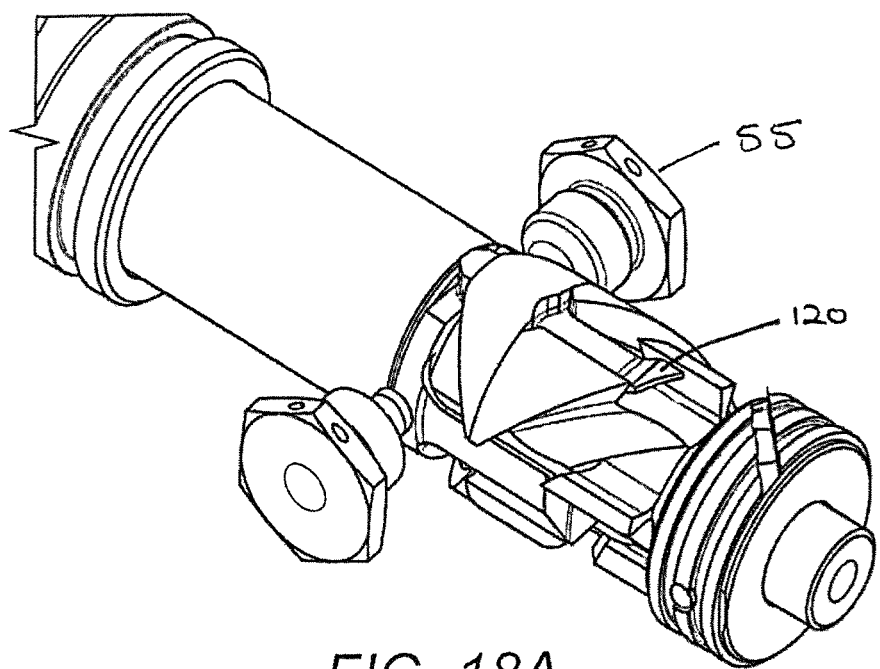
FIG. 18A shows an improved locking mechanism according to another aspect of the invention.
Figure 18B:
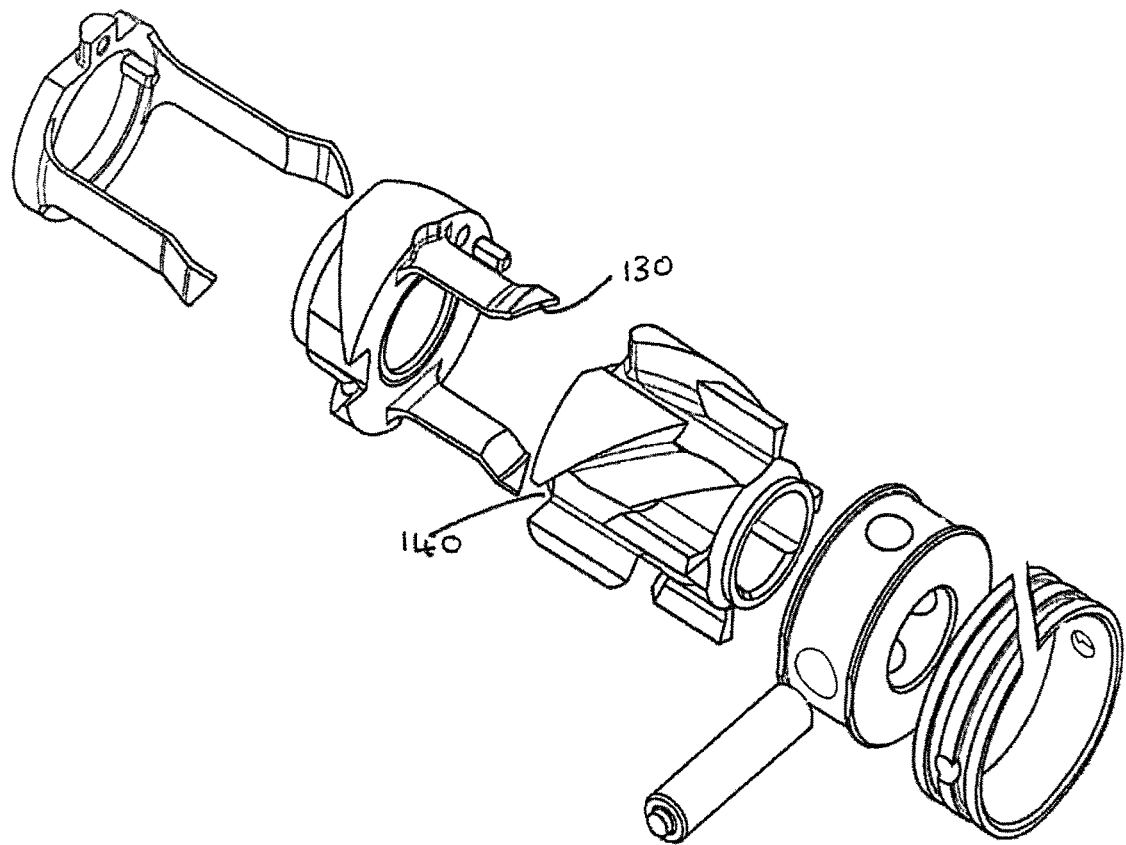
FIG. 18B is an exploded view of the locking mechanism of FIG. 18A.
Figure 19A:
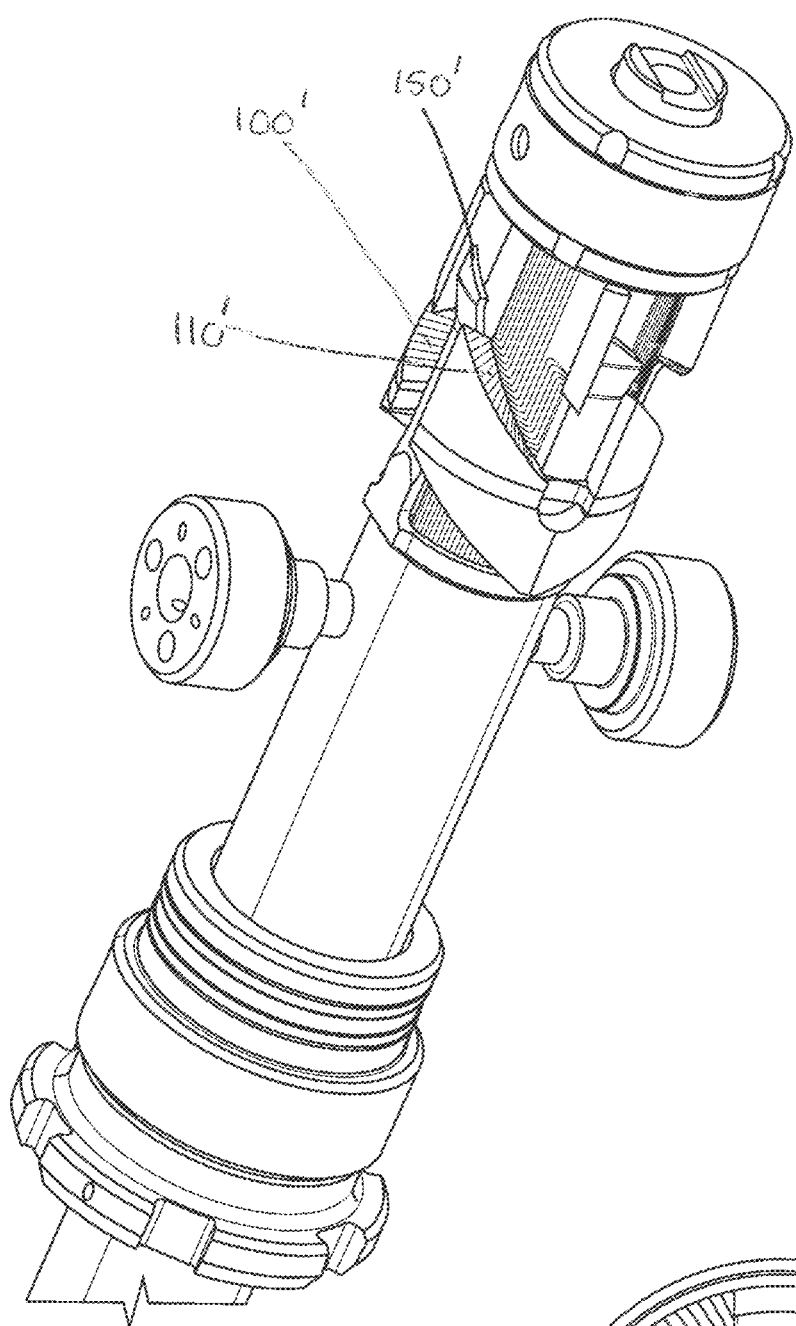
FIGS. 19A to 31B show how the various components move relative to each other during the locking and unlocking procedure.
Figure 19B:
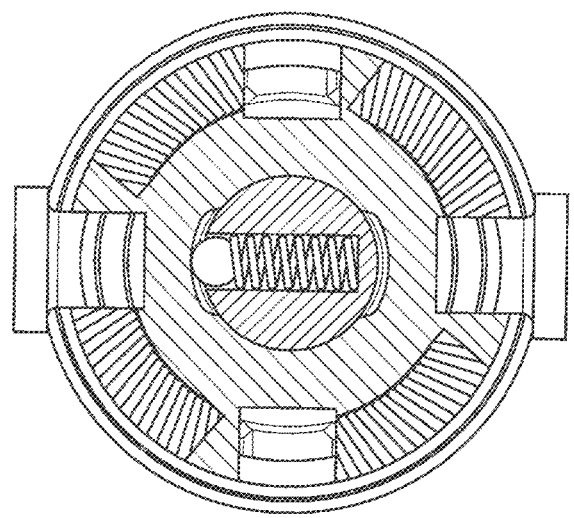

The present invention provides an improved mechanism for preventing the pin falling back into the locked position. FIG. 18A shows a partial perspective view of an actuator according to the invention. FIG. 18B is an exploded view of the locking mechanism. The invention provides a resilient detent 120 at the exit of the passage leading to the lock recess. This detent deflects down as the pin rides over it as the actuator extends to release the lock and, due to its resilience, springs up to form a detent once the pin has passed over it. Thus, even if the actuator is not fully extended, the pin is prevented from returning to the lock recess. The detent is preferably also formed with a sloping surface or ramp 130 such that as the pin passes over the detent, and pressure is removed, the pin rides along this ramp to cause rotation of the collar lock and guide the pin into the exit passageway 140 from which it exits the lock collar to retract the actuator.

The details of locking and unlocking operation of a system according to the invention can be seen more clearly with reference to FIGS. 19 to 31.

Similar to the locking and unlocking procedure described above with reference to FIGS. 1 to 17, as the actuator is extended, the locking pins come into engagement with the locking collar. In the embodiment shown here, the surface of the locking collar with which the pins first come into contact is sloped or helical, for reasons described more below, as opposed to having long flat lands.

Otherwise, the locking and unlocking procedure is essentially as described above.

Figure 20A:
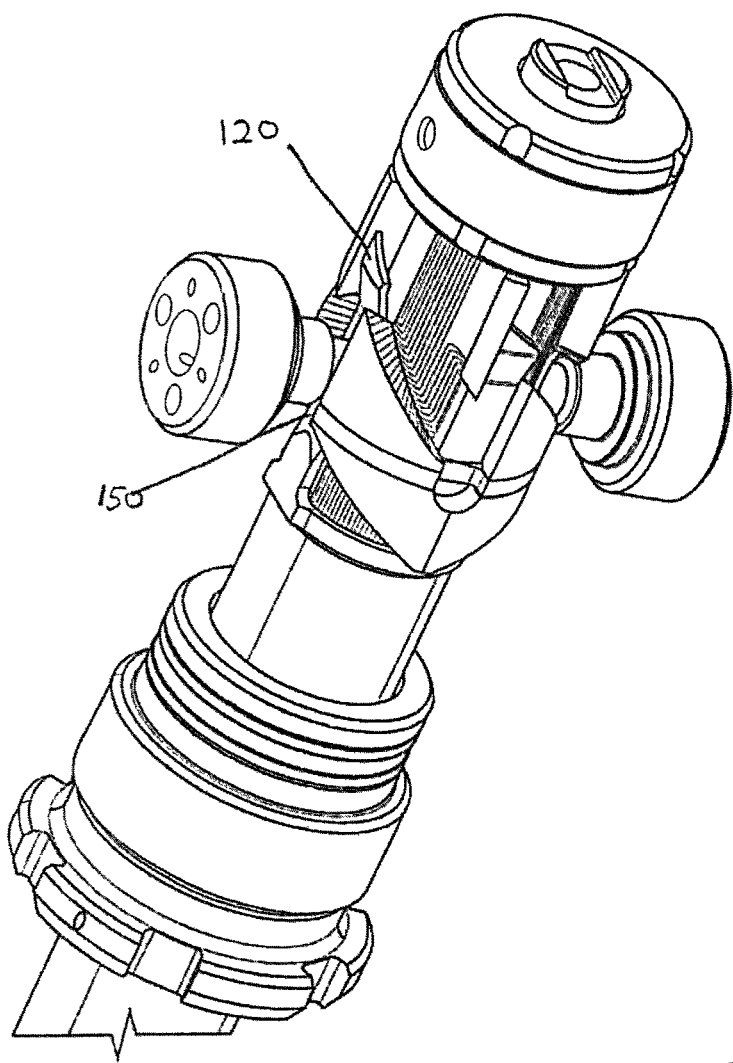
Figure 20B:
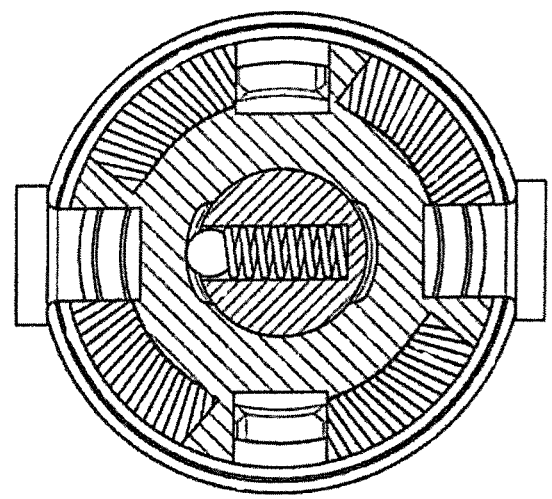
Figure 21A:
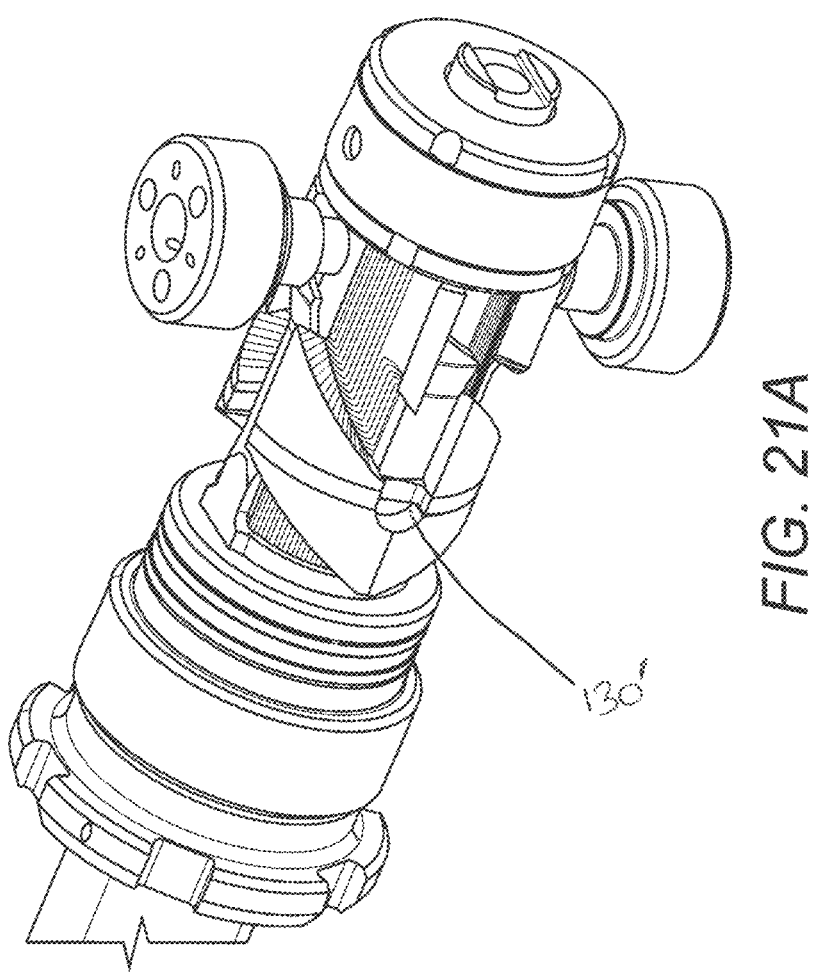
Figure 21B:
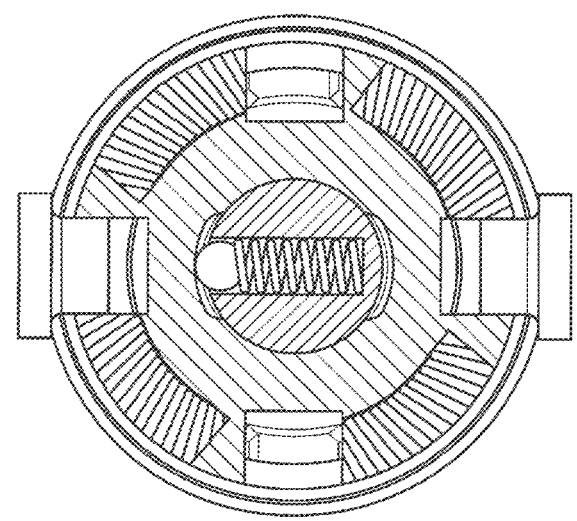
Figure 22A:
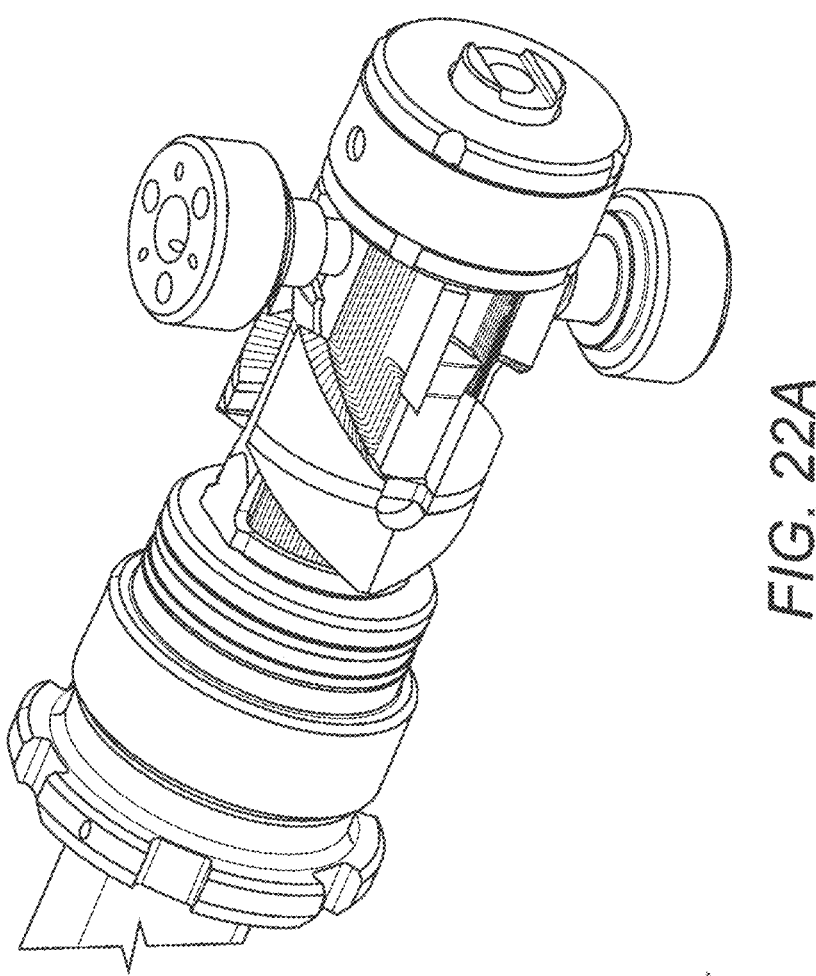
Figure 22B:
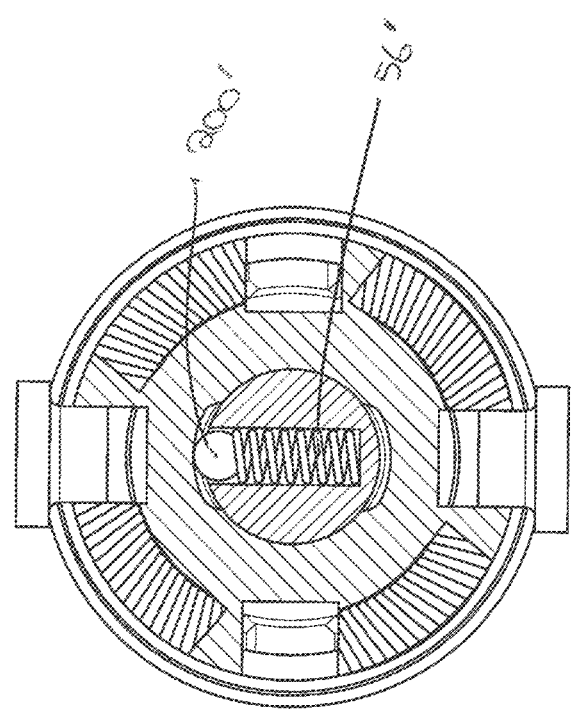

The pins enter the entry passage 150 as the actuator is extended (FIG. 20A). As the actuator continues to extend, the pin passes over the resilient detent 120 at the end of the entry passage. As the pin passes over the detent, it presses it down. The detent returns to its raised position after the pin has cleared it, preventing the pin returning back down the entry passage.

Figure 23A:
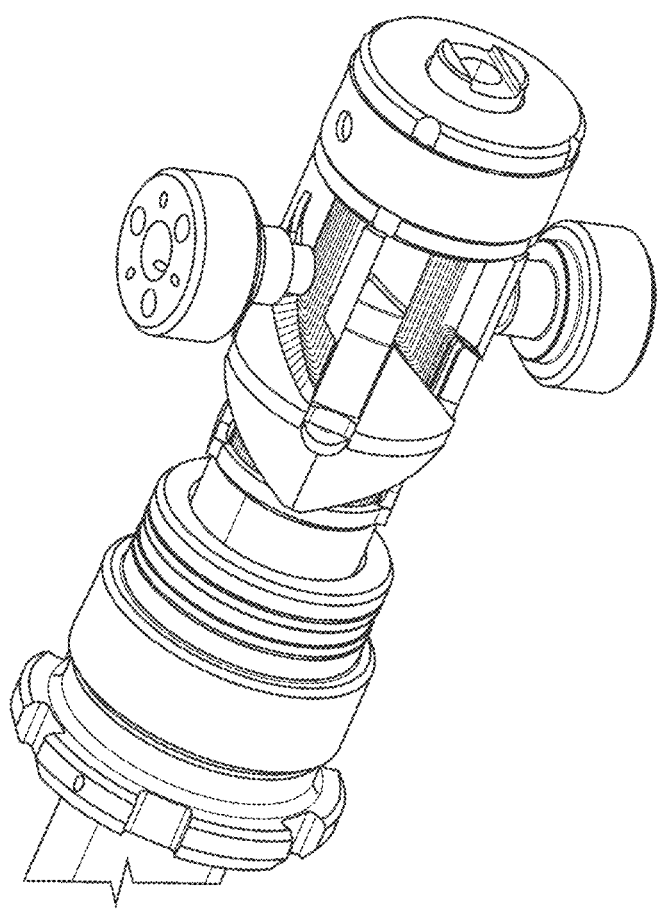
Figure 23B:
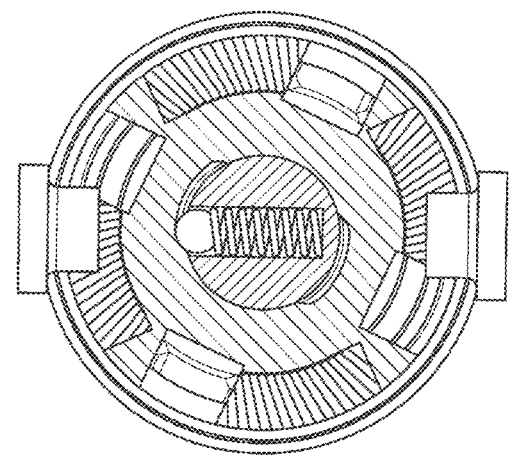
Figure 24A:
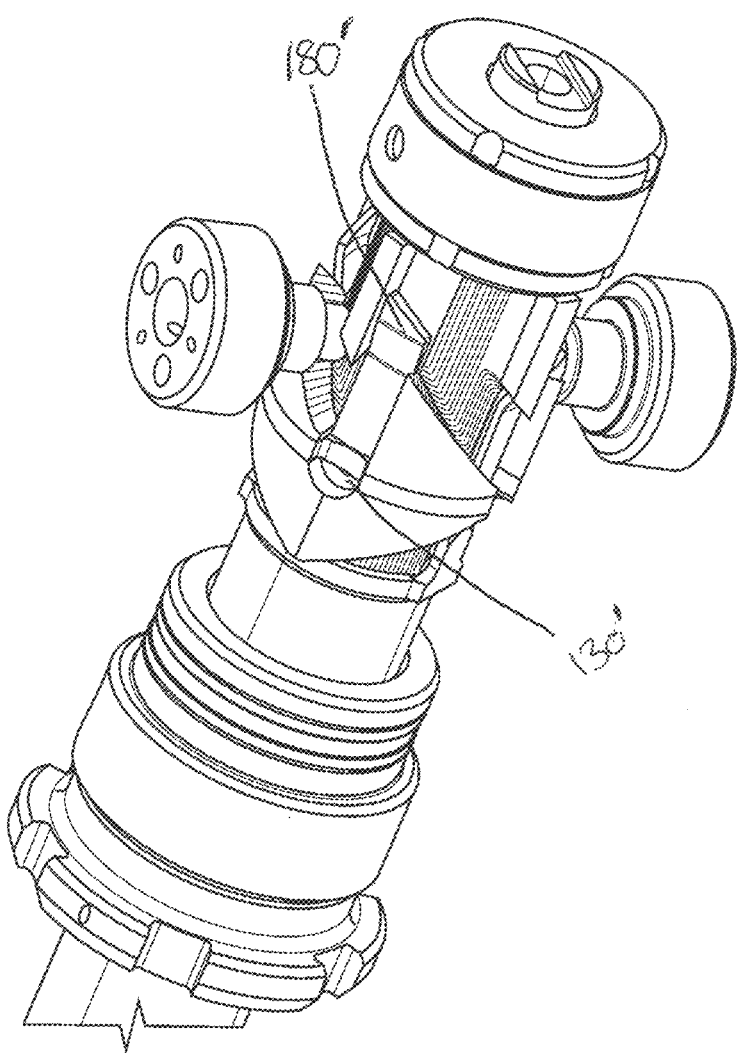
Figure 24B:
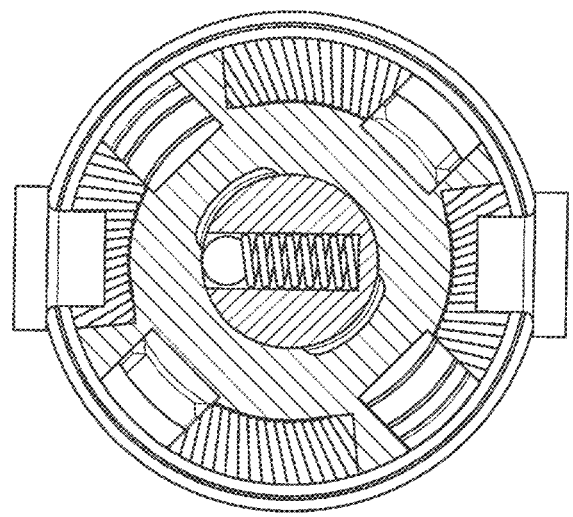
Figure 25A:
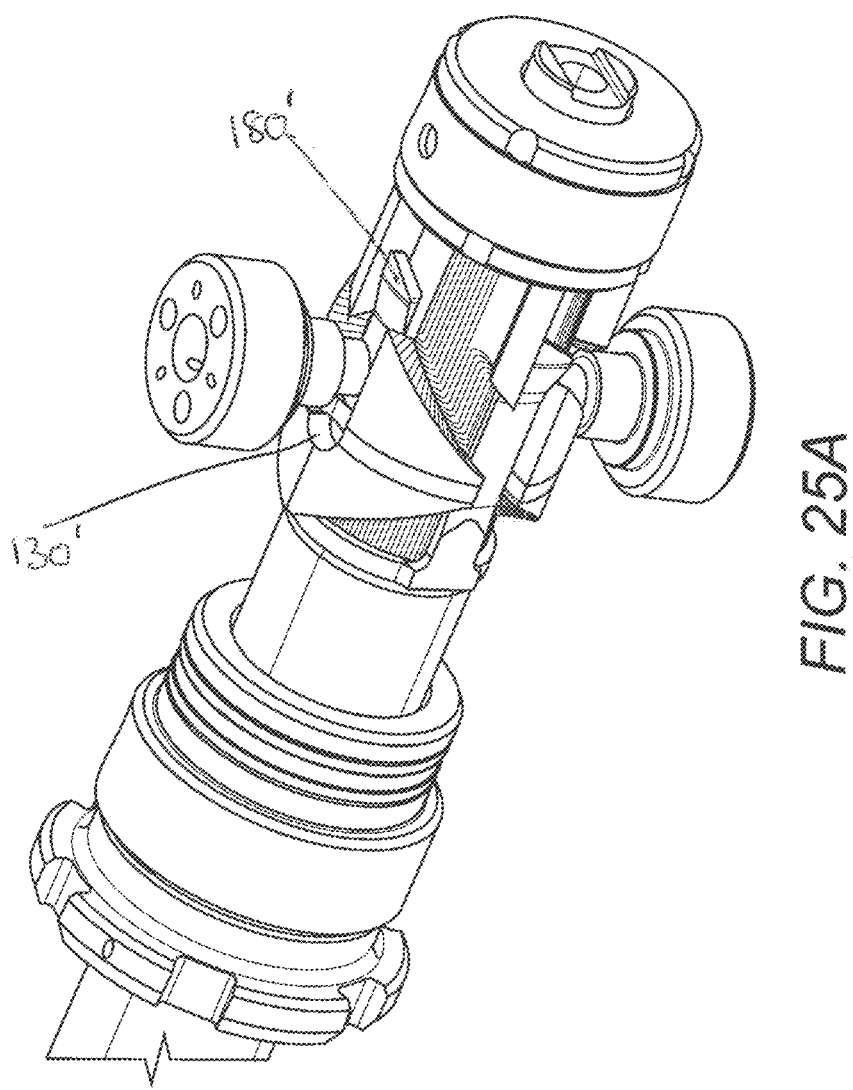
Figure 25B:
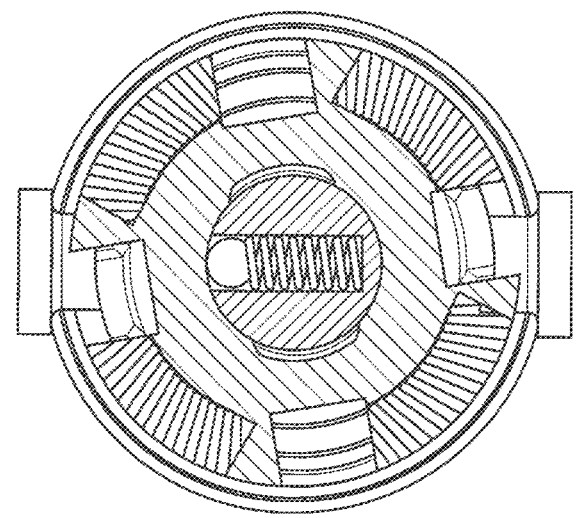
Figure 26A:
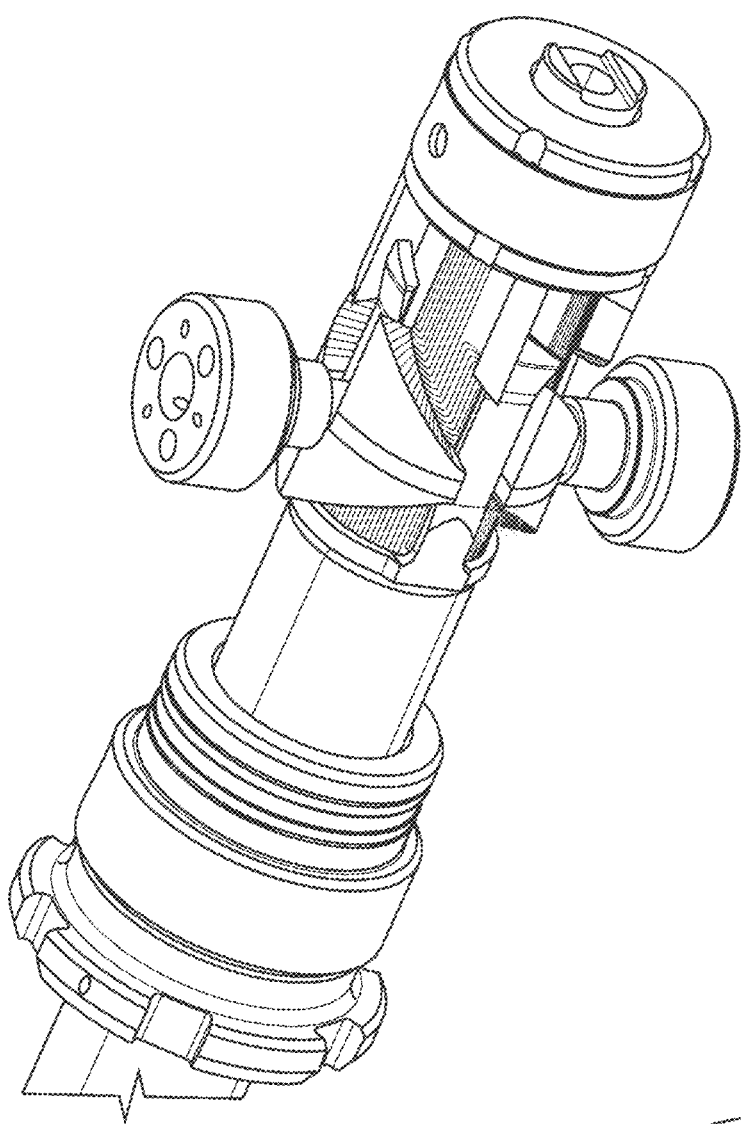
Figure 26B:
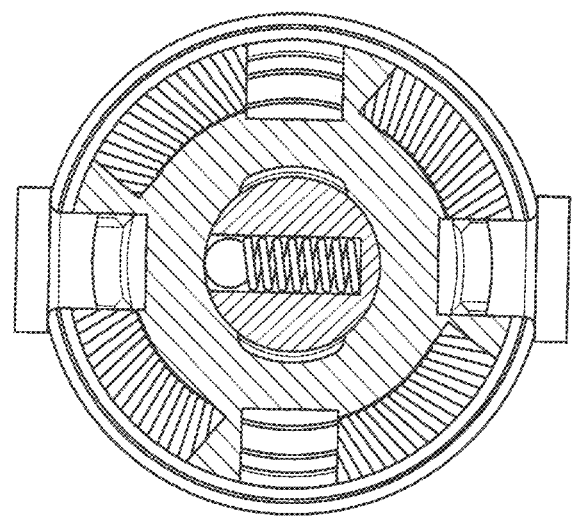
Figure 27A:
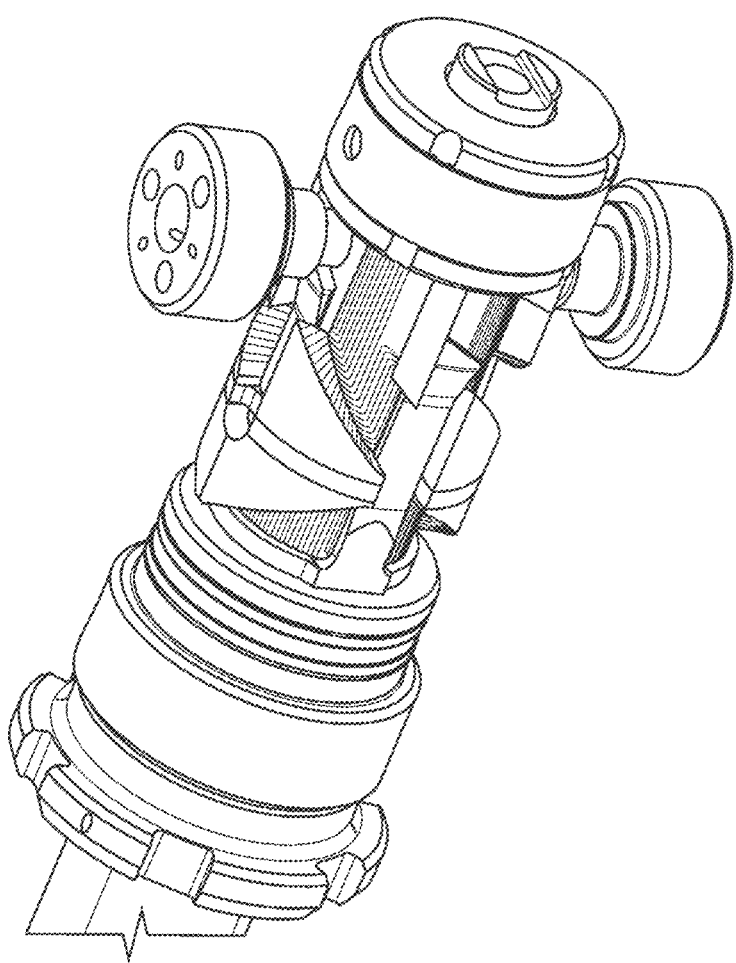
Figure 27B:
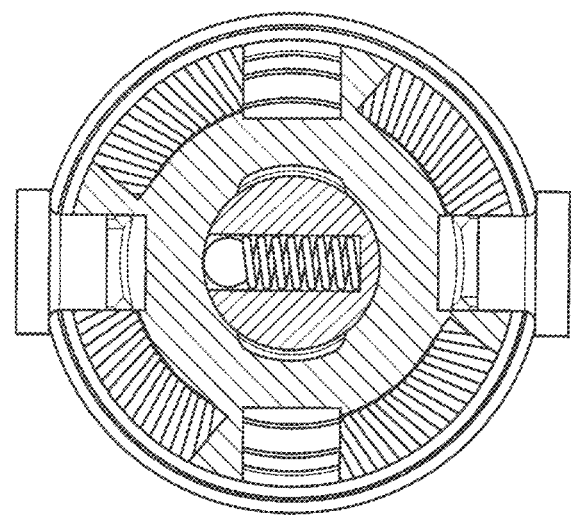
Figure 28A:
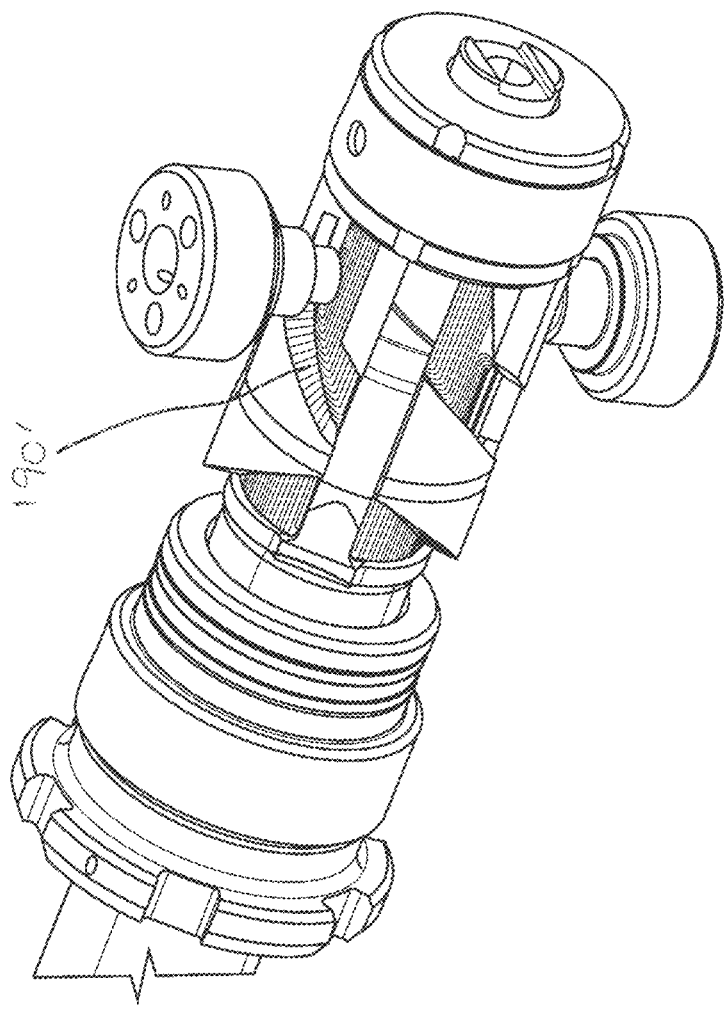
Figure 28B:
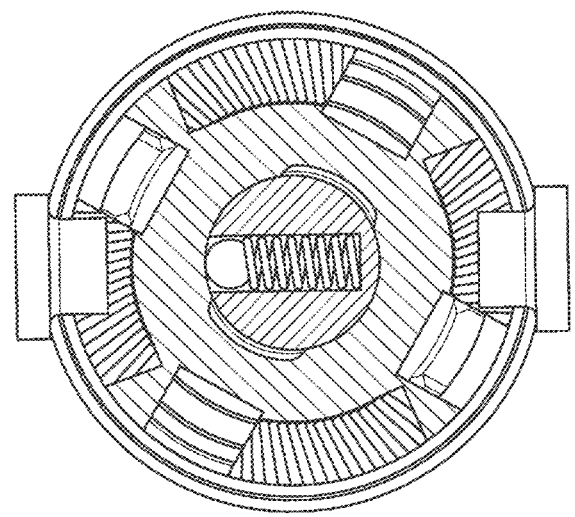
Figure 29A:
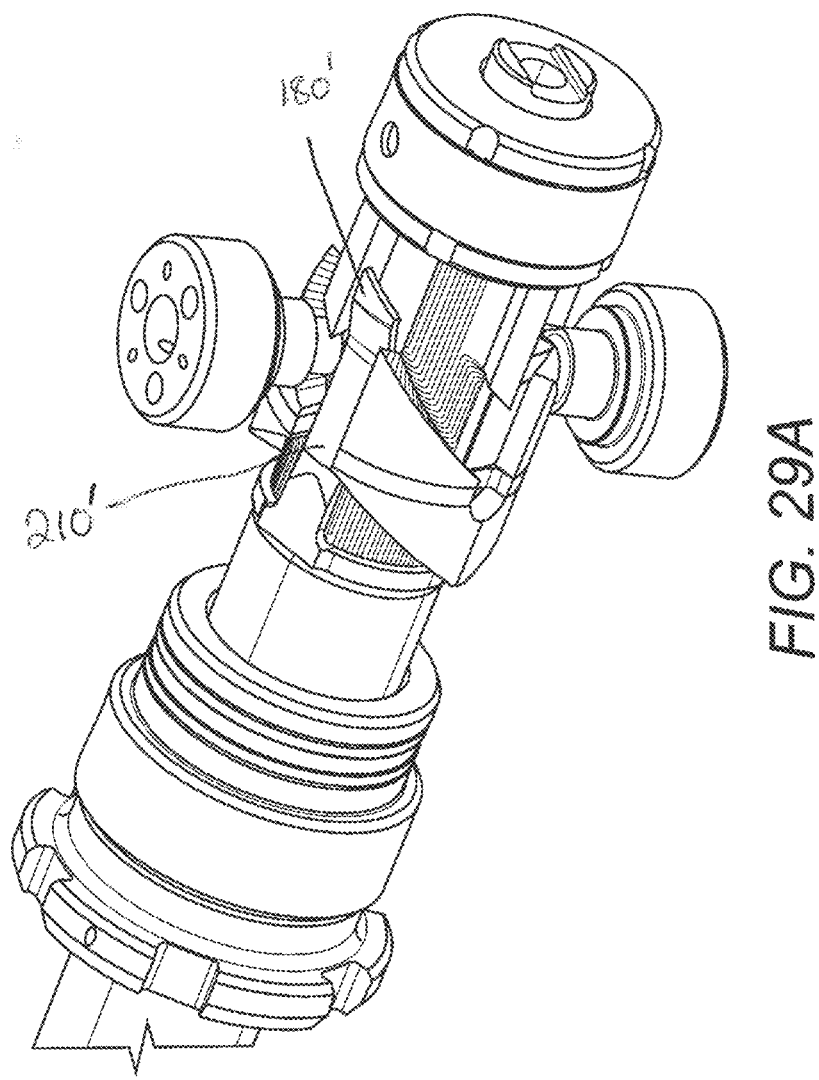
Figure 29B:
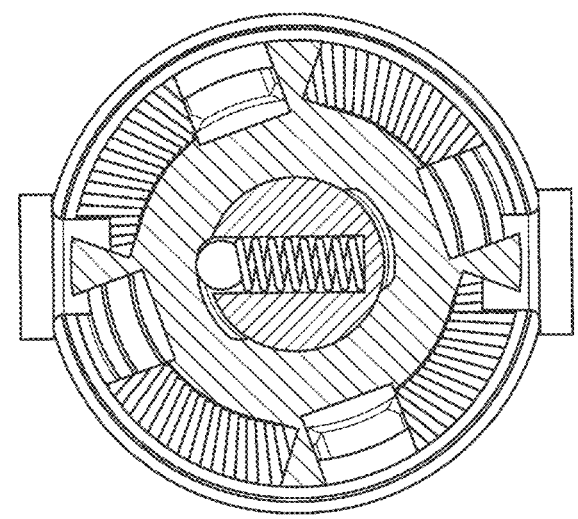
Figure 30A:
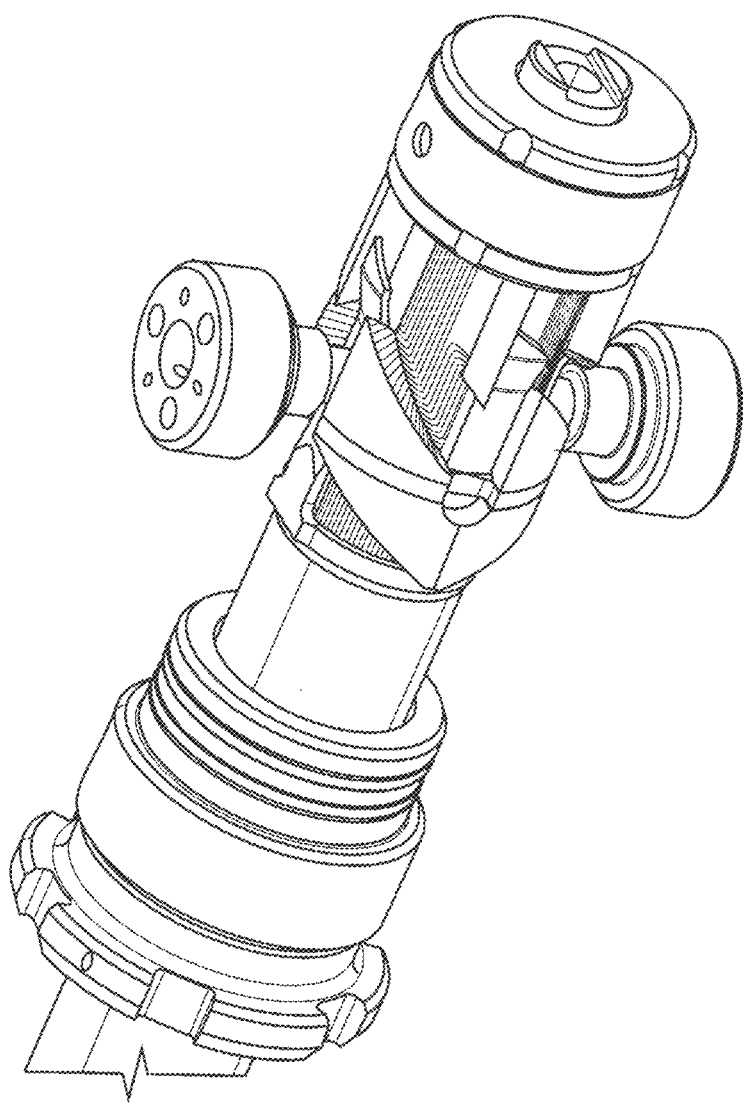
Figure 30B:
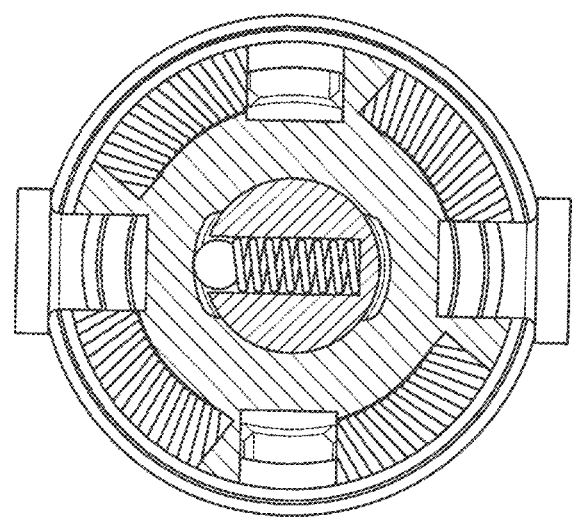
Figure 31A:
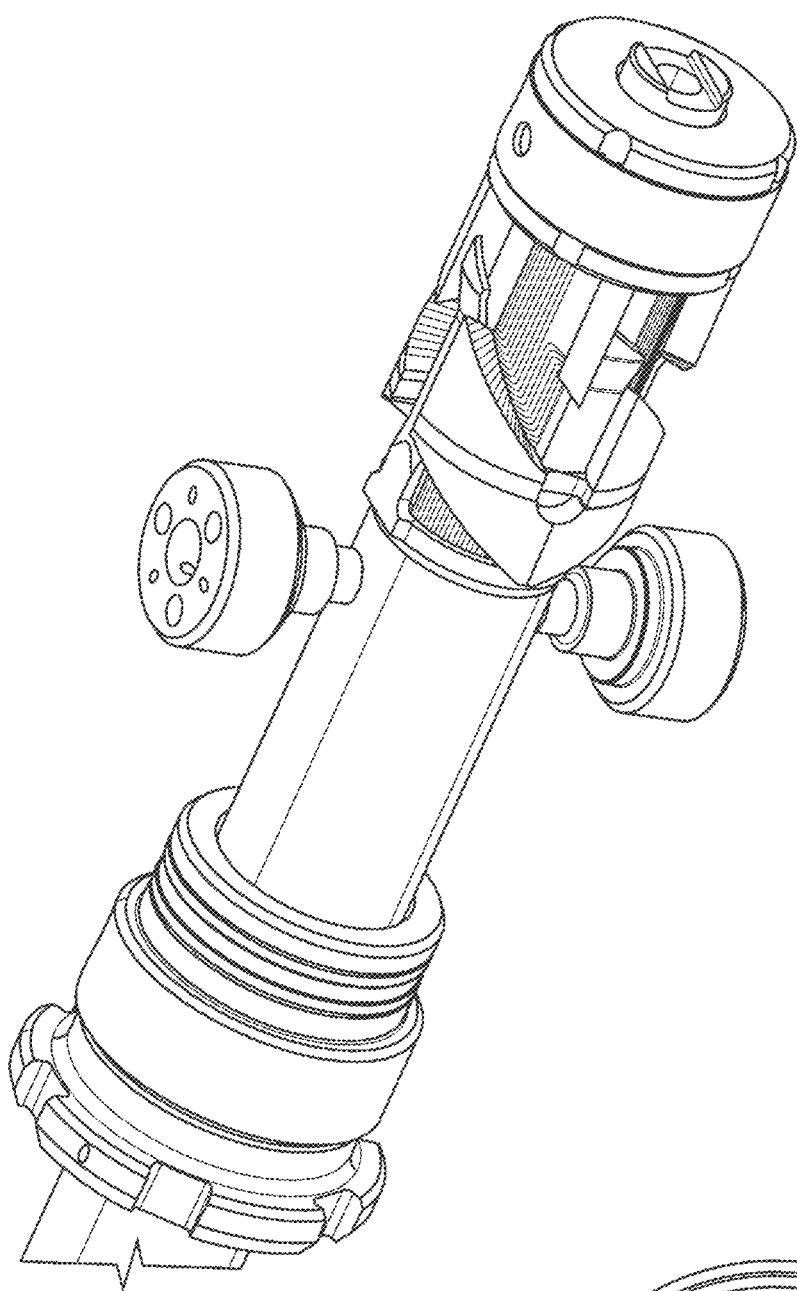
Figure 31B:
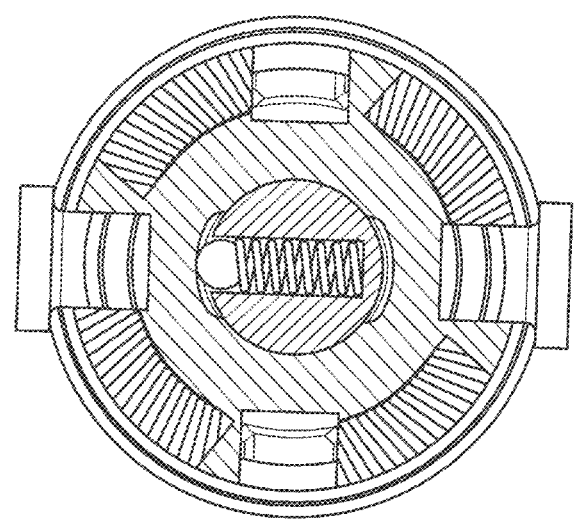

Once the actuator is fully extended, pressure is removed and the actuator will retract a small distance. It will abut a sloped surface 110', which may be formed by, or partially formed by the raised detent. The pressure of the pin on the slope will cause rotation of the collar relative to the pin, guiding the pin down towards the lock recesses 160 (FIGS. 23, 24). The pin then rides into the lock recess (FIG. 25) and comes to rest in the locked position (FIG. 26). As the pin rides into the locked passage, it passes over another resilient detent 170 which rises again after the pin has cleared it to enter the lock recess.

To unlock the actuator, to stow the door, pressure is again applied to the actuator to cause it to expand. The pin is forced out of the lock recess 130' and over the detent 180', which again rises after the pin has cleared it, to prevent the pin inadvertently returning into the lock recess if the actuator is not sufficiently extended.

The actuator is then fully extended (FIG. 27) after which pressure is removed. The actuator then begins to retract under the weight of the attached door. The pin abuts another sloping surface 180 (FIG. 28) which may be formed, or partially formed, by the detent, causing the collar to rotate. The pin is guided around the collar and into an exit passage 190 (FIG. 29) below the raised part of a detent. The exit passage is preferably the same passage as the initial entry passage.

The pin then exits the collar through the exit passage to fully retract the actuator and stow the door.

As mentioned above, the spring biased detent ball 200' mechanism in existing systems helps, to some extent, to prevent the locking pin(s) hanging at a null point and appearing to be in a locked position when the actuator is not, in fact, locked.

The spring biased detent ball mechanism can be seen in FIGS. 19B to 31B and comprises a spring 56' which biases two balls 200' at its ends against the inner wall of the lock collar. This inner wall is provided with a profile within which the balls travel as the collar is caused to rotate by the locking pins engaging with the lock collar outer path and passageways.

In addition to orienting the outer lock collar profile with respect to the lock pins, the spring biased detent ball mechanism provides an alignment mechanism in the event that the two eye ends (see FIG. 2) have been displaced, angularly, with respect to each other. If this happens, the locking pin will not directly meet the entry passage of the locking collar as the actuator is extended, but will engage with the locking collar slightly to the side of the entrance passage. Provided the angular displacement between the two eye ends is fairly small (not more than around 5 or 6 degrees), the spring biased detent ball will operate to rotate the collar such that the pin is aligned with the entry passage. This works because, as can be seen in FIG. 14B, the torque generated by the detent ball in the groove provided inside the locking collar will quickly index the collar lock back to its locked state.

Problems can, however, arise if the angular deviation between the two eye ends is greater than, say, 5 or 6 degrees. The inner slope over which the detent ball rides, inside the collar lock, cannot be lengthened and, therefore, the detent ball would sit at a position between the slopes and would not cause the automatic indexing provided at smaller angular deviations.

Another feature of an aspect of the present invention provides a solution to this problem and ensures, to a much greater degree, that even with larger angular deviations between the eye ends, up to around 45 degrees, the locking mechanism never hangs at a null point.

The solution to this problem, provided by an aspect of the present invention, is to provide a helical or sloping profile on the surface of the locking collar that comes into engagement with the locking pin(s).

In one example, there is an angular deviation of around 30 degrees. Of course, other angles would also work.

In this example, it can be seen that as the actuator is extended, the locking collar and the pins engage, but the pins do not meet the locking collar at the entry passage as they would in the case that the eye ends are properly aligned.

In the prior art systems, it could be the case that the pins engage with a flat land of the locking collar such that the spring biased detent ball mechanism is unable to rotate the collar to cause indexing.

With the sloping profile of the locking collar of the invention, however, the pin and sloping surface interact to cause rotation of the locking collar relative to the pin until the pin reaches the entry passage and the actuator locking mechanism then operates in a way similar to that described above.

This aspect of the invention provides a greatly increased tolerance to angular misalignment between the eye ends, without relying on the spring biased detent ball mechanism. The spring biased detent ball will still be provided to orient the helix profile on the mechanism of the locking collar with respect to the lock pin and retains the locking collar from rotating beyond a certain angle due to vibration, when the actuator is at the stowed state.

This modification will ensure that the pin(s) does not ever meet the locking collar at the flat land (which, in comparison to the prior systems, is small) when extended, but the ball mechanism cannot, as it can in the prior systems, cause a safety issue by falsely indicating that the actuator is locked, due to the ball being positioned at a null point.

In the most preferred system, this outer sloped or helical profile is provided in combination with the spring-biased detent mechanism provided at the end of the locking passage, to avoid false locking or positioning. It is envisaged, however, that advantages could be provided by the sloped profile per se.

The invention claimed is:

1. An actuator system having a first end and a second end comprising:
   a first eye at the first end;
   a second eye at the second end;
   a cylindrical housing running between the first and second end;
   an actuator rod slidably mounted within the housing;
   an actuator pin;
   a fluid port that passes through the housing near the first end of the housing through which fluid can be provided;
   a rotatable lock mechanism provided at an end of the actuator rod and being fixed to move axially with the actuator rod, wherein the actuator pin is mounted on and extends through a wall of the cylindrical housing at a location between the fluid port and second end of the cylindrical housing, the rotatable lock mechanism having channels formed therein that form for the actuator pin as the actuator rod is extended and retracted, wherein the rotatable lock mechanism has an entry passage having two sides through which the actuator pin enters as the actuator rod extends, a guide surface along which the actuator pin travels from the entry passage as the actuator rod retracts, a locking recess into which the actuator pin is guided by the guide surface, and an exit passage into which the actuator pin is guided as the actuator pin is caused to leave the lock recess by extension of the actuator rod and subsequent retraction;
   a first detent finger provided in the entry passage that blocks a return of the actuator pin back into the entry passage after the actuator pin has passed over the first detent finger; and
   wherein a second detent finger is provided on the rotatable lock mechanism between the lock recess and the exit passage which operates to block a return of the actuator pin back into the lock recess after the actuator pin has left the lock recess, so as to prevent the actuator pin from returning back into the lock recess when the actuator rod is extended to cause the actuator pin to leave the lock recess;
   wherein the second detent finger comprises a sloping engagement surface on both of the two sides of the entry passage against which the actuator pin abuts as the actuator rod extends.

2. The system of claim 1, wherein the rotatable lock mechanism comprises a collar within which the channels are formed and an interlocking ring on which the first and second detent fingers provided.

3. The system of claim 2, further comprising:
   a spring biased detent ball arrangement biased across an inner circumference of the interlocking ring.

* * * * *